(12) United States Patent
Bonetti et al.

(10) Patent No.: US 12,298,217 B2
(45) Date of Patent: May 13, 2025

(54) FLUIDIC DEVICE FOR CORPUSCLE ANALYSIS AND RELATED METHOD

(71) Applicant: Cell Dynamics ISRL, Imola (IT)

(72) Inventors: Simone Bonetti, Imola (IT); Domenico Andrea Cristaldi, Imola (IT); Riccardo D'Alpaos, Imola (IT); Daniele Gazzola, Imola (IT); Francesco Musmeci, Imola (IT); Azzurra Sargenti, Imola (IT)

(73) Assignee: Cell Dynamics ISRL, Imola (IT)

( * ) Notice: Subject to any disclaimer, the term of this patent is extended or adjusted under 35 U.S.C. 154(b) by 283 days.

(21) Appl. No.: 17/912,790

(22) PCT Filed: Mar. 19, 2021

(86) PCT No.: PCT/EP2021/057119
§ 371 (c)(1),
(2) Date: Sep. 19, 2022

(87) PCT Pub. No.: WO2021/186050
PCT Pub. Date: Sep. 23, 2021

(65) Prior Publication Data
US 2023/0148043 A1 May 11, 2023

(30) Foreign Application Priority Data
Mar. 20, 2020 (IT) .................. 102020000006031

(51) Int. Cl.
*G01N 15/10* (2024.01)
*G01N 15/00* (2024.01)
*G01N 15/1433* (2024.01)

(52) U.S. Cl.
CPC ..... *G01N 15/10* (2013.01); *G01N 2015/0053* (2013.01); *G01N 2015/1006* (2013.01);
(Continued)

(58) Field of Classification Search
None
See application file for complete search history.

(56) References Cited

U.S. PATENT DOCUMENTS 5,875,899 A * 3/1999 Nishiyama ............. C12M 47/04
209/208
6,432,630 B1 * 8/2002 Blankenstein .......... B03C 1/035
436/514

(Continued)

FOREIGN PATENT DOCUMENTS

DE 19911277 A1 9/2000
JP 2010524004 A 7/2010
WO 2017069260 A1 4/2017

OTHER PUBLICATIONS

International Application No. PCT/EP2021/057119, International Search Report and Written Opinion mailed Jun. 9, 2021, 15 pages.
(Continued)

*Primary Examiner* — Patrick Assouad
*Assistant Examiner* — Mark A Shabman
(74) *Attorney, Agent, or Firm* — Kilpatrick Townsend & Stockton LLP

(57) ABSTRACT

The present invention describes a fluidic device for measuring at least one of corpuscle mass density and weight. The fluidic device comprises a sedimentation chamber fluidly connected to an inlet channel configured to be immersed in a liquid. The fluidic device further comprises a pumping system connected to the sedimentation chamber. The pumping system is adapted to control the flow of liquid in the sedimentation chamber. A processor of the fluidic device is configured to obtain corpuscle data related to a corpuscle in at least one region of the sedimentation chamber; and calculate at least one of corpuscle mass density and weight based on the data received.

12 Claims, 16 Drawing Sheets

(52) U.S. Cl.
CPC ........... *G01N 2015/1021* (2024.01); *G01N 2015/1027* (2024.01); *G01N 2015/1028* (2024.01); *G01N 2015/103* (2024.01); *G01N 15/1433* (2024.01)

(56) References Cited

U.S. PATENT DOCUMENTS

| | | |
|---|---|---|
| 8,409,509 B2 | 4/2013 | Srienc et al. |
| 10,739,240 B2 | 8/2020 | Kawano |
| 2004/0072278 A1* | 4/2004 | Chou ............... B01L 3/502761 436/63 |
| 2008/0268469 A1* | 10/2008 | Srienc ............... G01N 15/1433 435/287.1 |
| 2013/0017538 A1* | 1/2013 | Ionescu-Zanetti ...... B03C 1/288 435/6.12 |
| 2013/0048875 A1 | 2/2013 | Yamaguchi et al. |
| 2013/0335731 A1 | 12/2013 | Jorden |
| 2017/0370818 A1* | 12/2017 | Gazzola ............ B01L 3/502761 |

OTHER PUBLICATIONS

Japanese Application No. 2022-555898, Japanese Office Action mailed Jul. 30, 2024, 9 pages.

\* cited by examiner

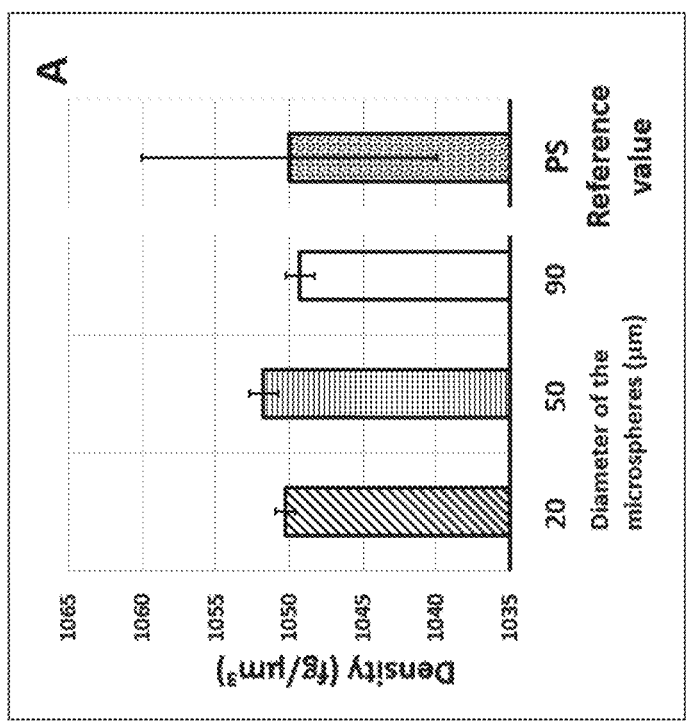
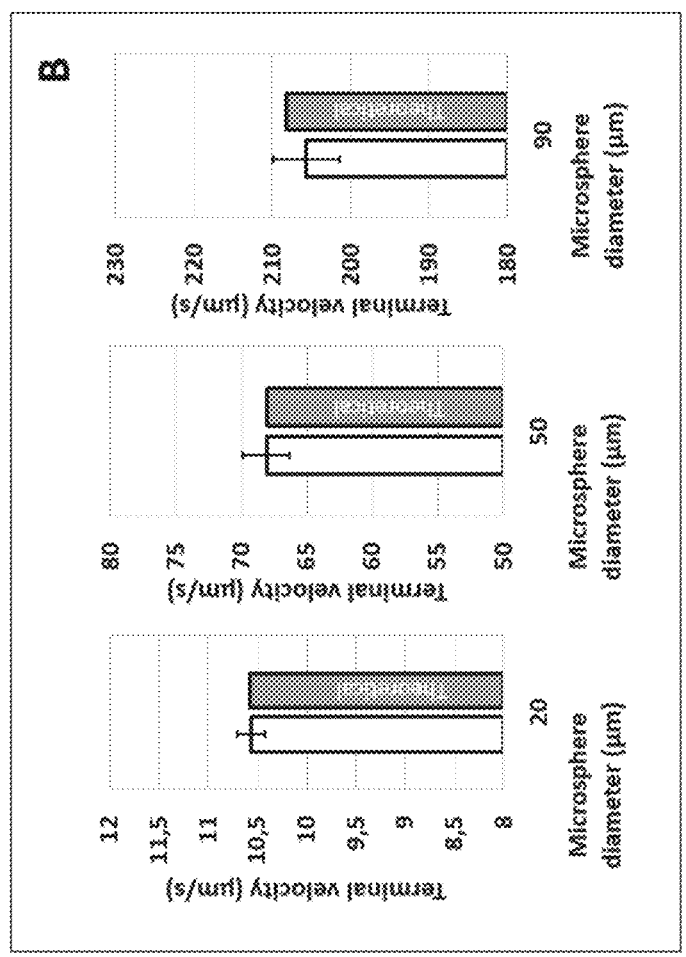
Fig 6a
Fig 6b

FLUIDIC DEVICE FOR CORPUSCLE ANALYSIS AND RELATED METHOD

CROSS REFERENCE TO RELATED APPLICATIONS

This application is a U.S. national phase of International Patent Application No. PCT/EP2021/057119 filed on Mar. 19, 2021, which claims priority to Italian Patent Application No. 102020000006031, filed in Italy on Mar. 20, 2020. The entire contents of both applications are hereby incorporated herein by this reference.

The invention described herein discloses a device and related method for measuring the mass density, weight, size, and shape of corpuscles such as microspheres, cells, spheroids, and organoids. In particular, the architecture of the device is adapted to measuring corpuscles having a size between one and five thousand micrometers.

The collection of detailed information on such parameters can have an important impact in industrial and/or research applications in fields such as pharmacology, cell biology, agro-industry, and the food and environmental fields. This growing need is attributable to the massive use of single cells and cell aggregates in a wide range of biomedical applications.

In particular, cells often show more noticeable variations in mass density rather than size, and obtaining reliable data on such values is a challenge to be overcome. The determination of such values can therefore provide an effective means of analysis for monitoring cellular responses to external stimuli, such as drugs and environmental changes. Furthermore, obtaining simultaneous information on the corpuscle volume and on mass density allows the correlation with biological activities, and obtaining important information. These include the level of organization and viability of the cell population within a cell aggregate.

BACKGROUND ART

Methods for determining the mass and density of cells, corpuscles or molecules have been implemented with the advent of nanoelectromechanical systems (NEMS), and in particular with the development of nano-mechanical resonators.

These systems are resonant when subjected to a specific frequency depending on the mass, structure, and rigidity thereof. The sample mass is measured by the variation in the oscillation frequency of the resonator when it interacts therewith. The initial limit for the biological applications of this technique was due to the need to operate under vacuum conditions. Suspended microchannel resonators (SMRs) have overcome this application obstacle, allowing the measurement of the density of single cells in solution and thus obtaining statistics on the density distribution.

However, using fluidic channels of micrometric dimensions, the aforementioned systems allow the analysis of corpuscles having a size smaller than tens of micrometers. This is an important technological limit for applications or studies on cellular aggregates such as spheroids and organoids which can reach diameters in the order of millimeters.

Methods are known for calculating the density of phytoplankton and polystyrene spheres using the sedimentation velocity. This technique does not allow reaching the average size of spheroids and organoids. More importantly, the data is collected in a single step, without the ability to repeat the measurement for more an accurate output.

Other techniques employ an optical induced electrokinetics system (OEK) to lift the corpuscles previously introduced into a microfluidic channel.

Such a solution is expensive to make, and is not adapted to measuring corpuscles having greater dimensions than twenty micrometers.

SUMMARY OF THE INVENTION

A first aspect of the present invention describes a fluidic device for measuring at least one of the mass density and weight of a corpuscle. The fluidic device comprises a sedimentation chamber fluidly connected to an inlet channel configured to be immersed in a liquid. The fluidic device further comprises a pumping system connected to the sedimentation chamber. The pumping system is adapted to control the flow of liquid in the sedimentation chamber. A processor of the fluidic device is configured to obtain corpuscle data related to a corpuscle in at least one region of the sedimentation chamber; and calculate at least one of corpuscle mass density and weight based on the data received.

The liquid can be a culture liquid or a solution, for example a saline solution, adapted to store and maintain one or more corpuscles or agglomerates of corpuscles to be introduced into the sedimentation chamber.

By virtue of the presence of an inlet channel directly connected to the sedimentation chamber, it is possible to perform individual mass density and weight measurements on a population of corpuscles. This configuration allows such measurements to be performed in sequence and in an automated manner. The measured values, in combination with the corpuscle data, such as the corpuscle size and shape, are important for example for the study of cell dynamics, or for the development of biological models of human organs.

In an embodiment of the first aspect, the fluidic device further comprises at least one detecting device configured to acquire the corpuscle data and to provide the corpuscle data to the processor.

In a further embodiment, the fluidic device where the processor is configured to control the pumping system based on at least a part of the received corpuscle data.

In a further embodiment, the corpuscle data comprises at least one of corpuscle velocity, shape, position, size.

In a further embodiment, the fluidic device further comprises a temperature control device, configured to provide the processor with a temperature measurement of a liquid in the sedimentation chamber. The processor is configured to calculate at least one of the corpuscle mass density and the weight even based on said temperature measurement.

The temperature measurement allows obtaining precise measurements even under conditions in which the device is not in a controlled temperature environment. In fact, the motion of the corpuscle in the sedimentation chamber also depends on the viscosity of the liquid in which it moves, which depends on the nature of the specific liquid used and the temperature thereof.

In a further embodiment, the temperature control device is further configured to adjust the temperature of the liquid in the sedimentation chamber based on at least one of the information provided by the processor and a predetermined temperature value.

The temperature control also allows adding the maintenance of the ideal conditions for the corpuscle maintenance to the measurement accuracy. For example, if the corpuscle consists of biological material, the ideal conditions are to maintain it at 37 degrees centigrade, and in some use protocols it may be required to change the temperature for the observation of specific biological phenomena.

In a further embodiment, the fluidic device further comprises a movable support adapted to house at least a part of the at least one detecting device. The processor is further configured to guide the movable support based on at least a part of the corpuscle data received.

By virtue of the movable support, it is possible to follow the corpuscle during the movement thereof, and therefore to obtain greater precision in the measurement of mass density and weight, and it is also possible to perform measurements on corpuscles moving at high velocities in particularly long sedimentation chambers. Furthermore, it is possible to obtain three-dimensional information on the corpuscle, for example by virtue of the observation of the sample from different angles, or on different focal planes. The data obtained on the three-dimensional shape of the object allow a better reconstruction of the viscosity coefficient, and therefore a greater resolution of the mass and weight density measurement.

In a further embodiment, the sedimentation chamber further comprises a flow channel fluidly connected to the inlet channel and having an internal cross-section which narrows in a portion of the flow channel.

In particular, the sedimentation chamber comprises a flow channel having at least two portions where the internal section of the first portion is larger than the internal section of the second portion.

The second portion is positioned so that a corpuscle in the sedimentation chamber is adapted to move from the second section to the first section in the absence of flows in the liquid in which the corpuscle is immersed.

Variations in the section of the sedimentation chamber allow obtaining converging flow lines. During a step in which a flow is produced in the sedimentation chamber, the corpuscle follows such flow lines, and therefore moves towards a more central region of the sedimentation chamber. By virtue of this phenomenon, measurement artifacts which depend on the interactions between the corpuscle and the side surfaces of the sedimentation chamber are avoided, and more precise measurements can be produced. This further ensures the centering of the corpuscle even for long measurement times, thus enabling the maintenance of the sample in the sedimentation chamber for biological experiments. Furthermore, centering is a useful aspect for withdrawing the sample, as it decreases the likelihood of sample loss in the fluidic system for example by adhesion to channel surfaces.

In a further embodiment, the sedimentation chamber comprises flow channels connected in parallel to one another and to the inlet channel. Each flow channel is further connected to a flow regulator. In such an embodiment, the processor is configured to receive input data related to a corpuscle in the inlet channel, and to control the flow regulators based on said input data.

The presence of several sedimentation chambers allows a corpuscle to be directed into an adequate sedimentation chamber based on the size thereof. It is thus possible to implement in a single instrument the measurement of corpuscles of even significantly different dimensions, for example from a micrometer to 5 millimeters. Alternatively, the presence of multiple sedimentation chambers allows a greater flow rate in the measurement of corpuscle populations.

In a further embodiment, the fluidic device further comprises a recirculation channel connected in parallel to the sedimentation chamber. The recirculation channel comprises a recirculation device, and the processor is configured to control the recirculation device for recirculating the liquid in the sedimentation chamber.

By virtue of the recirculation system, it is possible to avoid the presence of more than one corpuscle within the fluidic system and therefore to perform repeated non-destructive analyses of single corpuscles, and the recovery thereof. Furthermore, less analysis liquid is used for measurements prolonged over time.

In a further embodiment, the fluidic device further comprises a secondary channel fluidly connected to the sedimentation chamber. The processor is configured to selectively control the flow in the secondary channel to introduce liquid into the sedimentation chamber and/or to expel liquid from the sedimentation chamber through the secondary channel.

The secondary channel can be connected to the sedimentation chamber directly or by the inlet channel or by the secondary fluidic circuit.

The presence of at least one secondary channel allows the introduction of a new liquid into the sedimentation chamber during the measurement. It is thus possible, for example, to perform biological experimentation protocols. Furthermore, it is also possible to introduce new liquids adapted to the precision measurement of the specific corpuscle. For example, by selecting the liquid with a mass density closest to that of the corpuscle from a panel of measurement liquids, it is possible to improve the measurement precision and accuracy. Furthermore, the same secondary channel can be used for the removal of the sample and the sorting thereof into specific containers. For example, through special fluidic derivations, different corpuscles can be collected in different containers, even based on the results of the measurements performed.

A second aspect of the present invention describes a method for measuring at least one of mass density and weight of a corpuscle. According to the method, a corpuscle to be analyzed is introduced into a sedimentation chamber of a fluidic device through an inlet channel immersed in a liquid. Corpuscle data related to a corpuscle in at least one region of the sedimentation chamber are obtained. The corpuscle is moving in a liquid at rest in the sedimentation chamber. At least one of corpuscle mass density and weight is calculated based on the received data.

The measurement can be made while the corpuscle is moving in the liquid at rest. Liquid at rest means that there is no flow in the sedimentation channel. In an implementation, the corpuscle moves with accelerated motion subjected to a force field. For example, the sedimentation chamber can be positioned so that the corpuscle moves in the liquid at rest subjected to gravitational acceleration.

In an embodiment of the second aspect, obtaining the corpuscle data comprises acquiring, by means of at least one detecting device, the corpuscle data, and providing a processor with the acquired corpuscle data.

In a further embodiment, the method further comprises controlling a flow in the sedimentation chamber based on at least a part of the received corpuscle data.

In a further embodiment, the method further comprises measuring a temperature of the liquid in the sedimentation chamber; and calculating the at least one of the corpuscle mass density and weight even based on said temperature measurement.

In a further embodiment, the method further comprises adjusting the temperature of the liquid in the sedimentation chamber based on at least one of the information provided by the processor and a predetermined temperature value.

In a further embodiment, the method further comprises guiding at least a part of the at least one detecting device based on at least a part of the received corpuscle data.

In a further embodiment, the method further comprises recirculating the liquid in which the corpuscle to be analyzed is immersed in a recirculation channel fluidly connected in parallel to the sedimentation chamber.

In a further embodiment, the method further comprises replacing, before and/or after a measurement of at least one of the corpuscle mass density and weight, the liquid in which the corpuscle to be analyzed is immersed with a second liquid which is different from said liquid.

In a further embodiment, the method further comprises selecting a corpuscle based on one of mass density, weight, size, and shape; and collecting the selected corpuscle in a predetermined container based on at least one of corpuscle mass density, weight, size, and shape.

The advantages described above in relation to the fluidic device also apply to the method described in relation to the second aspect and the embodiments thereof.

BRIEF DESCRIPTION OF THE DRAWINGS

FIG. 6. A) Experimental results of the average densities obtained on the three batches of PS microspheres, shown in comparison with the value declared by the manufacturer, and respective standard deviation. B) Terminal velocity determined experimentally, in comparison with the theoretical velocity, for the three quantities of microspheres examined.

DETAILED DESCRIPTION

Figure 1:
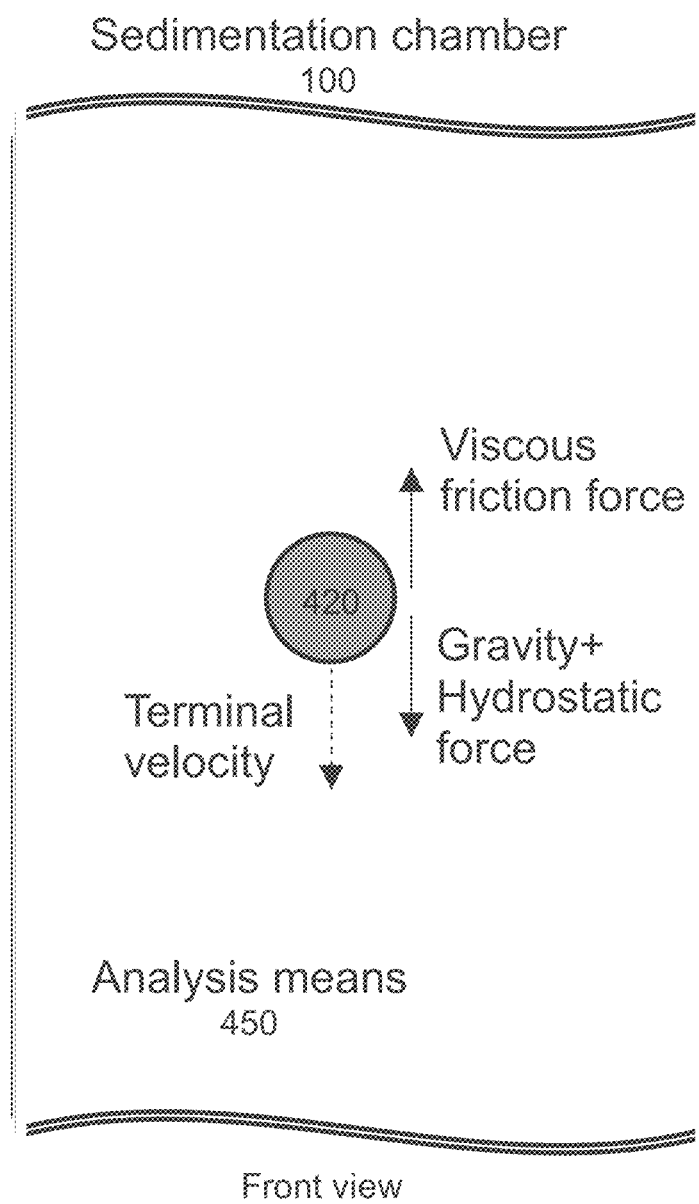
FIG. 1. Front view of the sedimentation chamber containing the analysis medium and the corpuscle. Depiction of the forces involved and the terminal velocity.

It is increasingly common for a single medical or biological laboratory to study corpuscles of different natures such as cells, microspheres, spheroids, organoids and/or other forms of corpuscular aggregates.

Given the huge variety of samples and the interest in the measurement of weight, density, size and shape, the embodiments and implementations described below present technological solutions which allow measuring such parameters by adopting a single device and different use methods associated therewith. An embodiment of the present invention describes a first solution which allows such measurements to be carried out. In an example, the measurement of weight, density, size, and shape can be performed concomitantly, simultaneously or combined on samples having dimensions ranging from one to five thousand micrometers. In addition to having the advantage of operating with a single instrument for a large size distribution of samples, this allows for a solid correlation between the data obtained on the individual corpuscles.

The embodiments of the fluidic device and related methods described in the present disclosure allow performing the analysis described above in an economical, accurate and non-invasive manner. Such fluidic methods and devices can be used to perform measurements not only on organic and biological targets, but also on inorganic samples.

The following paragraphs describe several exemplary embodiments of the present invention. By way of example, and to facilitate understanding, the embodiments will be described with reference to the analysis of biological material such as cells or cellular agglomerates, indicated below with the generic term corpuscles. It is however understood that the method and the device related to the invention shown herein allow measuring the mass density, weight, size, and shape of non-biological corpuscles. In particular, the implementations with reference to the exemplary embodiments described below can also be used to analyze corpuscles other than cells or cell agglomerates. Therefore, the term "corpuscle", used in the context of the embodiments of the present invention to indicate cells, cellular agglomerates, or biological material in general can also be used to indicate micro-corpuscles, residual corpuscles of industrial production processes, suspended atmospheric dust, pollen, vesicles, drops of oil in aqueous suspension, air bubbles in liquids.

Likewise, the term "analysis medium" or the more generic term "liquid" is used in the explanatory examples of the present invention to indicate a medium compatible with cell cultures. However, it will be apparent to those skilled in the art that the term "analysis medium" and the term "liquid" must be interpreted in the most general sense thereof. In particular, based on the design requirements and the nature of the corpuscles to be analyzed, it will be apparent to those skilled in the art that the liquid can be a cell culture medium or liquids of another nature, such as aqueous-based solutions, or oils.

The present invention has the purpose of bridging the gap within the prior art concerning the possibility of using a single technological apparatus, and the related method of use, for the concomitant measurement of corpuscle mass density, weight, size and/or shape, also of different sizes. In fact, the devices present today can operate partially in a narrow size distribution. Furthermore, they do not allow obtaining simultaneous or combined measurements of such parameters. This leads to obtaining fragmented information, difficult to be mutually correlated.

Even if the object has been described with particular reference to the accompanying drawings, the reference numerals used in the description and the claims are used to improve the understanding of the invention and do not form any limitation to the claimed scope of protection.

The invention discloses a new device, and the related method of use, capable of performing the concomitant measurement of mass density, weight, size and/or shape of biological and non-biological corpuscles such as microspheres, cells, spheroids, and organoids, having a size between 1 and 5,000 micrometers.

After a detailed description of the various implementations adapted to obtaining such a measurement, multiple use modes of the present invention will be disclosed. The latter comprise adaptations of the basic system, with particular reference to the usefulness thereof in the biomedical field. The present invention is adapted to analyze a corpuscle (420) in motion under flow conditions at rest, guided by the force of gravity (FIG. 1). Such movement of the corpuscle is mainly influenced by the mass density, volume, shape, orientation thereof and the mass density and viscosity of the surrounding liquid.

Figure 2:
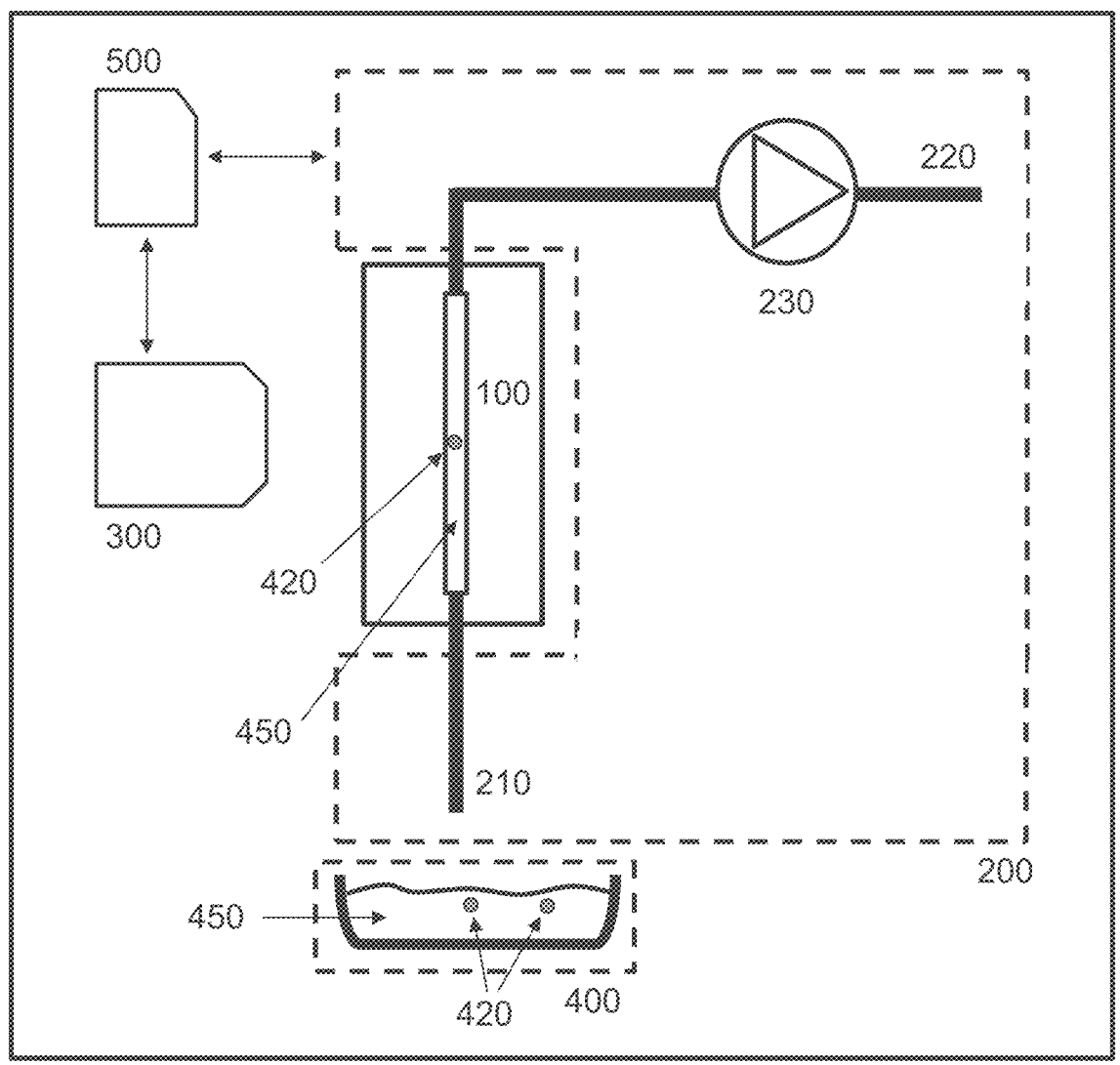
FIG. 2. Diagrammatic depiction of the invention.

A diagrammatic depiction of an embodiment of the present invention is shown in FIG. 2.

The embodiments described with reference to FIGS. 3 to 16 describe subsequent improvements and developments of the fluidic device of FIG. 1. Individual features described below with reference to a single drawing can therefore be combined with features described with reference to the other drawings.

The fluidic device comprises a sedimentation chamber 100, a pumping system 200, a detecting device 300 and a processor 500. The movement of the corpuscle 420 occurs inside a fluidic channel with transparent walls, called the sedimentation chamber 100 herein. The pumping system 200 comprises a flow generation system 230 which, by way of example, can be a peristaltic pump or a pressure control system. An inlet channel 210 and an outlet channel 220 can be connected to a loading or unloading tank, alternatively they can be used as a vent. The system comprising the detecting device 300 connected to the processor 500 carries out the dual role of monitoring the movement of a corpuscle 420, and of measuring the shape and size thereof. Both the sedimentation chamber 100 and the detecting device 300 are sized to allow accurate measurements of the movement, shape, and size of the corpuscle 420, as described in detail later in the text.

Although the device of FIG. 2 includes the detecting device 300, the detecting device is optional. In alternative implementations, the fluidic device can be made without the detecting device.

In particular, in the context of the embodiments of the present invention, "measuring the shape and size" of the corpuscle means the measurement of any feature of the corpuscle which can be used to represent or approximate the three-dimensional geometry of the corpuscle. This could coincide with the measurement of the radius, in the case of a spherical corpuscle, or with other geometric features in the case of nearly spherical and non-spherical corpuscles.

For a correct operation of the device, the corpuscle 420, contained inside the analysis medium 450, is withdrawn from the tank 400, introduced into and transported inside the sedimentation chamber 100 through the inlet channel 210. The transport of the corpuscle inside the pumping system 200 occurs through the activation of a flow generation system 230. After the introduction of the corpuscle 420, the flow is blocked and the corpuscle moves within the analysis medium 450 guided by the force of gravity. In the absence of other flows, and after a transitory time due to an acceleration step, the corpuscle will reach the constant velocity thereof, here defined as terminal velocity, drift velocity or sedimentation velocity.

Once the measurement has been carried out, the inlet channel 210 and the outlet channel 220 can be used indifferently for the recovery of the corpuscle 420.

The device can be used to perform relative measurements, in which the differences between different corpuscles are evaluated, or to perform absolute measurements. In the latter case, it is useful to know the temperature so as to define the mass density and viscosity of the analysis medium 450. In an embodiment of the present invention the device is adapted to be used inside a controlled temperature environment, for example in an incubator. Alternatively, the temperature can be measured during the experiments. In an embodiment (FIG. 3) of the present invention, the average temperature of the analysis medium 450 is measured by a temperature control device 600 composed of at least one sensor 610, positioned near the sedimentation chamber 100. The processor 500 then adapts the calculated viscosity values as a function of the measured temperature.

In another embodiment, when the operating conditions require a specific temperature value (e.g., 37° C. for live biological samples), the temperature control device 600 is configured to adjust the temperature of the liquid in the sedimentation chamber based on information provided by the processor 500, such as the current temperature value, the type of corpuscle, the viscosity of the liquid, the current value of the viscosity of the liquid, etc. In a specific embodiment, the temperature control device 600 manages the temperature adjustment unit 620, which allows the maintenance of a specific value during the analysis. For example, the temperature control device 600 can comprise several heaters (620a and 620b) and sensors (610a and 610b), located in various positions of the fluidic device, of the pumping system 200, and in particular near the sedimentation chamber 100.

From the physical perspective, and in order to maximize the accuracy of the data obtained, the movement of the corpuscle can be considered when the terminal velocity thereof is reached, and not during the transitional period. The relative velocity of the corpuscle with respect to the analysis medium v(t), can be obtained by solving the dynamic equation in the motion equation:

$$F = m_p a = (\rho_p - \rho_t) V_p g - kv$$

$$v(t) = v_d + (v_0 - v_d) e^{-t/\tau}$$

Where $\tau$ is the transitional period of the corpuscle dynamics:

$$\tau = \frac{m_p}{k} = \frac{\rho_p V_p}{6\pi\eta r} = \frac{2}{9\eta}\rho_p r^2$$

where $m_p$ is the corpuscle mass, $\rho_p$ is the corpuscle mass density, a is the corpuscle acceleration, $\rho_l$ is the mass density of the analysis medium, $V_p$ is the corpuscle volume, $v_d$ is the corpuscle drift velocity, $v_0$ is the initial corpuscle velocity, r is the corpuscle radius, k is the friction coefficient, $\eta$ is the viscosity of the analysis medium and g is the gravitational acceleration.

In order to have an estimate of the order of magnitude of such a transitional period, calculations are shown below in the case of biological corpuscles of different sizes and types, measured in aqueous solutions. The aqueous-based solutions have a viscosity of about 1 mPa·s, and the mass density of the biological corpuscles is on average 1020 fg/μm3. In the case of corpuscles with a diameter between 1 and 2,000 micrometers, the order of magnitude of $\tau$ varies from 60 ns (for a diameter of 1 μm) to 250 ms (for a diameter of 2,000 μm). In such an interval, the corpuscles reach terminal velocity in little time. Since this time span is negligible, the acceleration of the corpuscle has no impact on the measurement and the corpuscle dynamics can therefore be considered as a uniform linear motion.

Other technical implementations of the embodiments of the present invention allow the measurement of larger corpuscles, in particular between 2 and 5 millimeters in diameter. For such implementations, the transient time must be considered, as it can reach 1.5 seconds in the case of samples of 5 millimeters in diameter.

For example, in an embodiment of the present invention, the corpuscle is brought to a predetermined distance above the working region of the detecting device 300, so as to exclude the transitional period from the measurement.

In another implementation of the present invention, the working region of the detecting device 300 is sufficiently large, and the sedimentation chamber 100 is sufficiently long, to allow the detection of the complete dynamic motion of the corpuscle, including acceleration and terminal velocity. The data collected during the transitional period of the corpuscular motion may not be considered for the calculation of the terminal velocity.

In one embodiment of the present invention, the theory used for the measurement is based on an elaboration of Stokes' law, in which:

$$v_d = \frac{(\rho_p - \rho_l)V_p g}{6\pi\eta r} = \frac{2}{9\eta}g(\rho_p - \rho_l)r^2 \quad \text{(eq. 1)}$$

and $$\rho_p = \frac{9}{2g}\eta\frac{v_d}{r^2} + \rho_l \quad \text{(eq. 2)}$$

$$W_p = \rho_p V_p \quad \text{(eq. 3)}$$

Where $W_p$ is the corpuscle weight.

In order to demonstrate the reliability of such an invention, a specific implementation of the same (FIG. 2) was used to measure the mass density and size of polystyrene microspheres between 20 and 90 micrometers.

Figure 4:
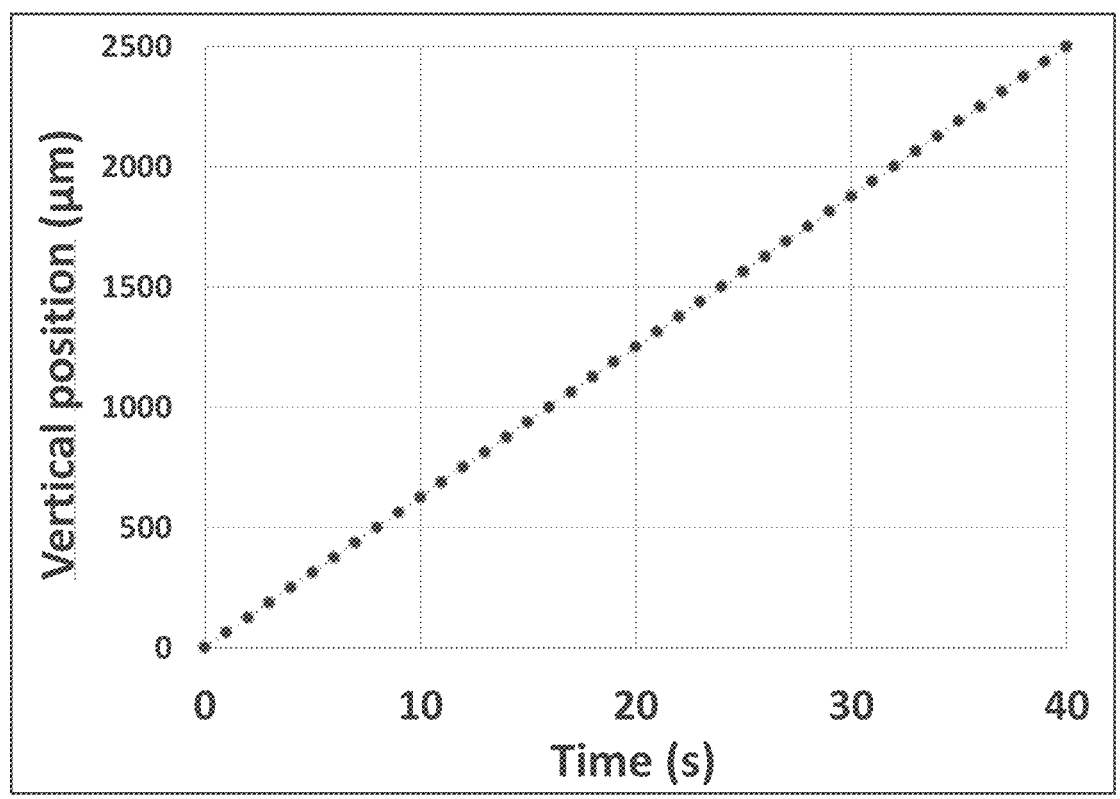
FIG. 4. Linear regression data obtained from the vertical variation of the corpuscle position as a function of time.

In such an implementation, the detecting system 300 is composed of an optical microscopy system with 4× magnification. The sedimentation chamber 100 is obtained inside a transparent polydimethylsiloxane (PDMS) chip covalently adhered to a slide. The architecture of the sedimentation chamber 100 has a length of 6 cm, and a cross-section of 1×1 mm. The corpuscle is positioned in the upper part of the sedimentation chamber 100 by a flow generation system 230, consisting of a peristaltic pump in this implementation. Prior to the arrival of the sample in the sedimentation chamber 100, it is transported through the pumping system 200, in this case consisting of polytetrafluoroethylene (PTFE) tubes. The processor 500 consists of a computer and related software, capable of processing the images collected by the microscopy unit. The two-dimensional projection of the corpuscle shape and the terminal velocity thereof are extrapolated from these images. The latter is calculated through the linear regression obtained from the variation of the position of the corpuscle centroid as a function of time (FIG. 4). The processor 500 then calculates the mass density and diameter of the corpuscles by adopting the previously shown mathematical model. This procedure is repeated several times on each corpuscle to obtain statistically significant results.

Figure 5:
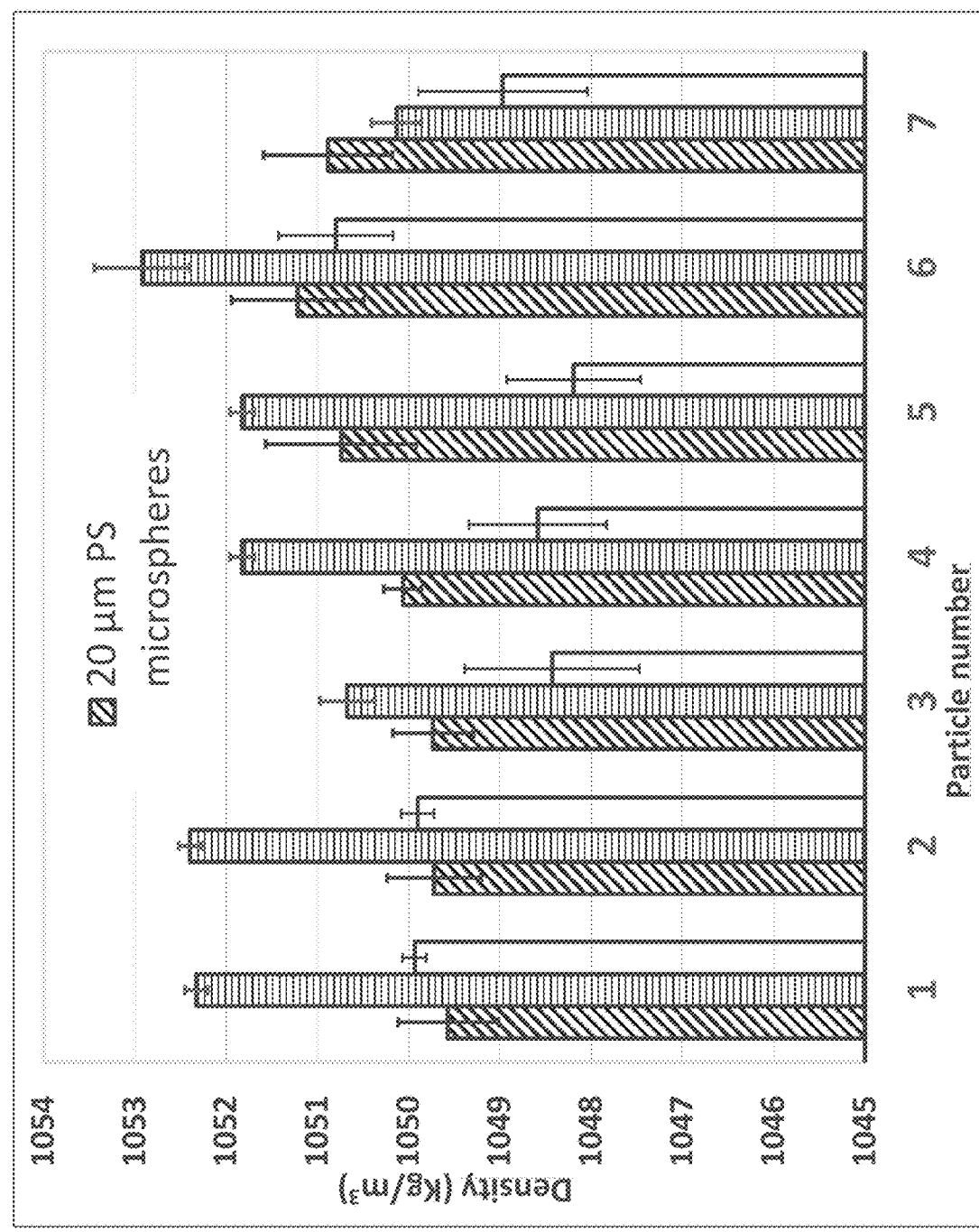
FIG. 5. Experimental results of the average densities obtained on seven different PS microspheres measured for each batch analyzed (20, 50 and 90 µm), and the respective standard deviations obtained on seven repetitions for each measurement.
Figure 7:
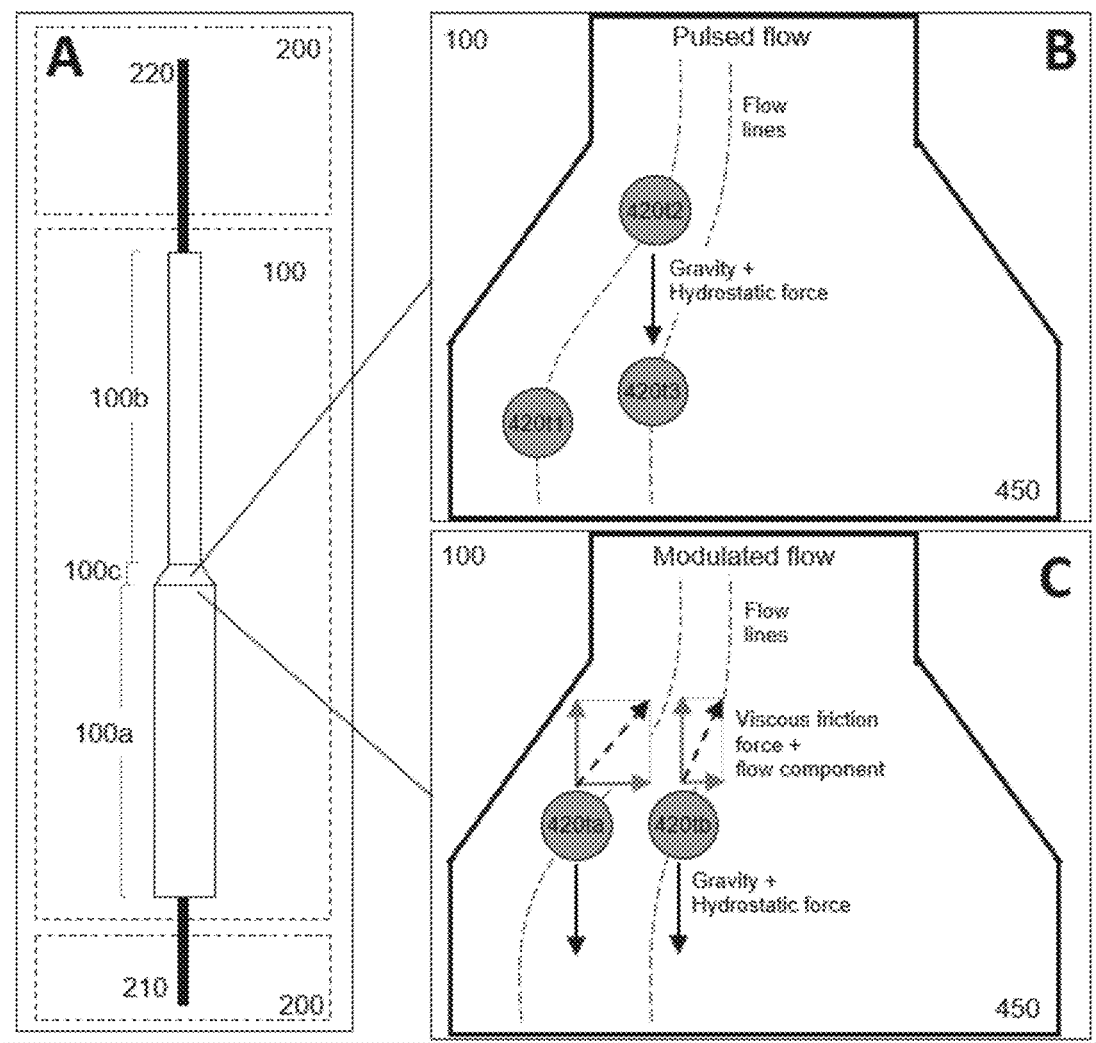
FIG. 7. Diagrammatic depiction of the centering device (A). Enlargement of portion $100c$ (A, B) for the diagrammatic depiction of the corpuscle centering by pulsed flow (B) and by modulated flow (C).
Figure 8:
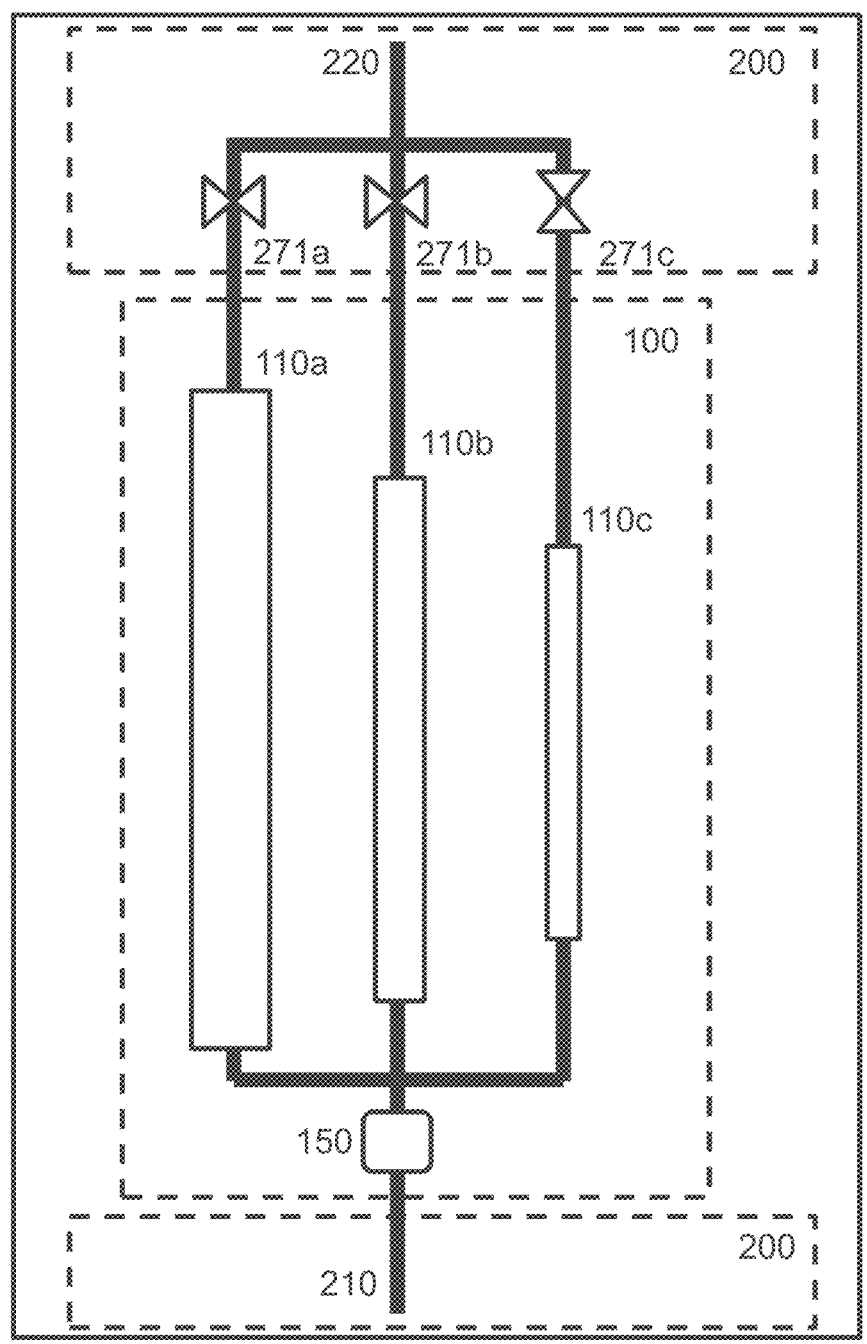
FIG. 8. Diagrammatic depiction of the sedimentation chamber comprising several flow channels having different quantities, connected to independent flow regulators, so as to satisfy corpuscular diversity.
Figure 9:
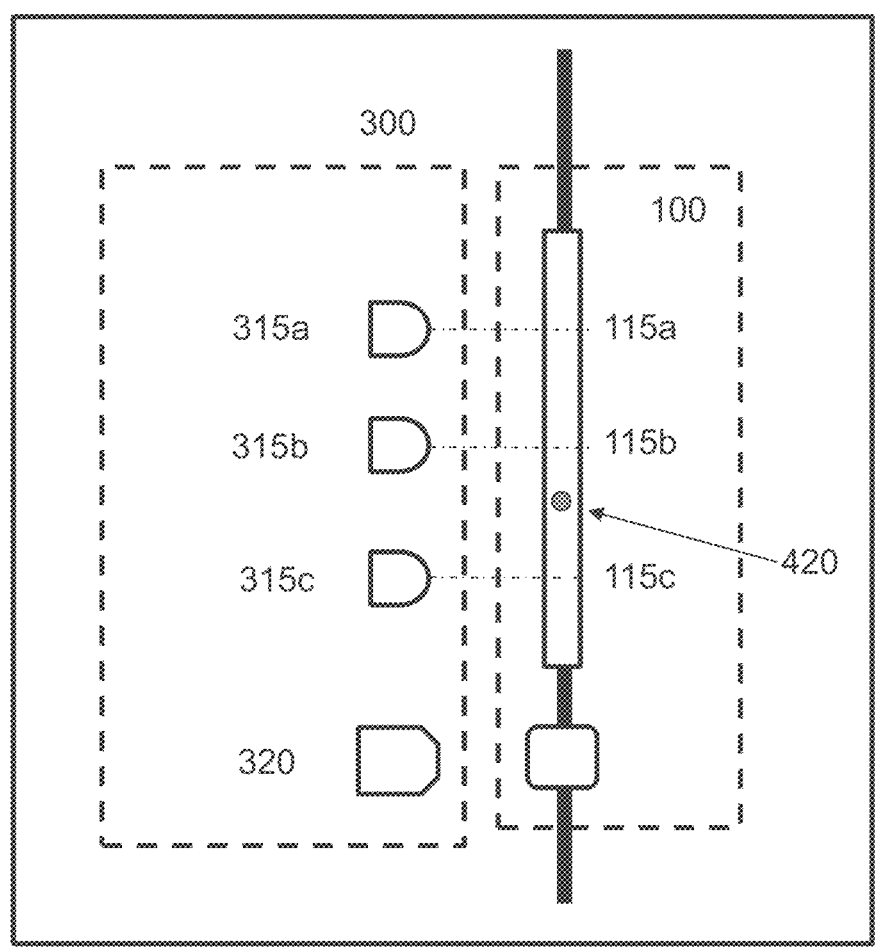
FIG. 9. Diagrammatic depiction of the technological solution related to the measurement of the movement of large corpuscles, by the recognition of the passage of the corpuscle from different target positions at an adjustable and known distance.

This specific implementation was used to measure corpuscles with known densities and diameters in order to validate the invention. In particular, three batches of microspheres in polystyrene (PS) (Polybead®, Polysciences Inc. US) having a diameter of 20, 50 and 90 micrometers were selected. The product sheet provided by the seller indicates, for PS spheres, the average mass density value of 1.050±10 fg/um3. Seven different units were analyzed for each batch of microspheres, and the measurement was repeated seven times for each unit, so as to increase statistical significance. FIG. 5 shows the mean density value of the seven different microspheres analyzed, and the respective standard deviation extrapolated from the seven repetitions for each batch. In line with experimental expectations, the standard deviations of the measurements performed on all the microspheres are comparable, demonstrating the accuracy and reliability of this implementation.

Furthermore, the density values obtained for the PS microspheres were found to be considerably more accurate than the average value declared by the manufacturer (FIG. 3a). In particular, it can be noted that the average standard deviation has a lower order of magnitude than that of the commercial value (FIG. 6a). Further confirmation of the accuracy of the results is obtained by comparing the theoretical terminal velocity (eq. 1) and the experimental one (FIG. 6b).

Specifically, the same configuration shown in FIG. 2, used for the validation analysis carried out on the PS microspheres, can be adopted for the analysis of large biological samples, such as spheroids or organoids.

The relevance of such applications relates to the possibility of using the method shown herein for example to monitor the growth phases of spheroids. It is in fact an important aspect which allows understanding the moment in which a population of spheroids reaches the maturity required or desired by the operator, to continue biological experimentation. In fact, the spheroid formation process undergoes a compaction over time, starting from an agglomeration of disintegrated cells, and reaching a compact aggregate stage. This is particularly important in biomedical fields, where the biological material normally used for analyses is not standardized, thus leading to less reliable results. Simultaneous measurement of the bulk density, together with the weight, shape, and size of the sample, could allow understanding the best conditions for the growth of standard spheroids. Furthermore, spheroids can be generated from different types of cells or from a combination thereof, therefore both the time required to reach maturity and the mass density characteristic of the mature phase are different for each type of spheroid. An important application field for which it is important to determine the mass density value during the spheroid formation process relates to the industrial drug screening process. In this context, the efficacy of a pharmacological treatment can be evaluated by studying the absorption of the drug in the spheroids themselves. Indeed, it is known that the penetration of the drug is highly correlated to the level of compactness of the aggregate, which in turn can be related to the mass density thereof. Therefore, the evaluation of the correct structure of the spheroids, in terms of mass density, can greatly improve the reproducibility of the results. This implementation of the invention aims to improve this aspect of the research which currently represents one of the main limits for the application of 3D biological models, aimed at the discovery and development of drugs.

However, spheroids are not the only corpuscles used in the biomedical field. The various nature of the corpuscles is also reflected in the wide range of dimensions they cover, ranging from single cells to organoids. Given the interest of researchers on the entire range of corpuscles, the possibility of carrying out the simultaneous measurement of the mass density, weight, size, and shape thereof, using a single instrument, would be of considerable impact for the scientific community.

In this regard, the following paragraphs describe the methodological and/or technological embodiments adopted to expand the dimensional range of the corpuscles which can be analyzed.

For example, in an adaptation of the invention, a high-magnification optic is required for the analysis of micrometric corpuscles, capable of having a sufficient resolution to detect the size and shape thereof. Another adaptation relates to the fact that, generally, a corpuscle of a millimeter will tend to have a higher fall rate than a corpuscle of a micrometer. Therefore, the sedimentation chamber 100 must be long enough to allow the measurement of the terminal velocity thereof. Therefore, the correct selection of a specific detecting device 300 and of the sedimentation chamber 100 could be relevant to broaden the operative field of the invention.

In an example of the implementation described above, the detecting device 300 is composed of an image acquisition system, which acquires a series of frames of the corpuscle 420 during the movement thereof inside the sedimentation chamber 100. Such images are processed to obtain the size, shape, and position of the corpuscle centroid with respect to time. The terminal velocity is calculated using a linear regression algorithm, as shown in FIG. 4. This specific implementation requires that a sufficient number of moving corpuscle images is collected so as to obtain a correct number of points, which will then be used by the regression algorithm. For example, under conditions of spherical corpuscles, an acceptable number of points could be 5, while under conditions of non-spherical corpuscles, the acceptable number of points could be higher due to the additional uncertainty in recognizing the corpuscle centroid. Specifically, the number of points that the device is able to obtain during a measurement depends on various experimental and technological factors. These comprise the terminal velocity of the corpuscle, the length of the portion of the sedimentation chamber observable by the recognition system, the frame rate, and the optical resolution. Such factors can be combined in a formula which includes the number of analysis points detected in the specific technological and experimental conditions, shown herein as:

Number of frames =

$$\text{Min}\left(\frac{\text{Camera } fps}{v_r}, \frac{1}{\text{Optical resolution}}\right) \cdot \text{Observed fall length}$$

In a particular implementation of the embodiment of the present invention, the acceptable number of analysis points is fixed at a specific value, for example 10. Conversely, in another embodiment of the present invention, such an acceptable number of analysis points is variable, and is regulated by an optimization algorithm. For example, the algorithm can adjust the ideal number of analysis points based on the fitting quality of the corpuscle position data, as a function of time.

Furthermore, in order to improve the accuracy of the measurements, the device allows the corpuscle to be positioned in the center of the sedimentation chamber before performing the analysis. For example, in an embodiment of the present invention, the device uses a corpuscle centering system by a geometry variation and/or a narrowing of the sedimentation chamber 100. The operating principle is based on the use of a specific geometry of the sedimentation chamber which allows obtaining laminar flows therein with a non-zero horizontal component. Under such conditions, by an appropriate control of the pumping system 200, the corpuscle can be transported to the area of the sedimentation channel in which the flow has a zero horizontal component. In the following, and more generally in the context of the present invention, vertical means the direction parallel to the gravitational force vector, and horizontal means any vector perpendicular to the vertical direction.

For example, if the sedimentation chamber is arranged vertically, if the corpuscle is in a position, inside the sedimentation chamber, where the flow lines have a non-zero horizontal component, the corpuscle is also affected by a lateral thrust due to the horizontal component of the flow. In a particular embodiment of the present invention, the sedimentation chamber 100 is vertically oriented and consists of two portions having a horizontal section of different sizes, so that the channel with a wider section (100*a*) is located below the narrower section channel (100*b*), as shown in FIG. 7A. Furthermore, in this particular example, the two portions (100*a* and 100*b*) of the sedimentation chamber (100) are coaxially connected by a channel portion with an inclined section (100*c*). The time required for centering the corpuscle can vary, depending on the value of the inclination angle of the walls of the portion 100*c*, the narrowing percentage of the section of the smaller portion of the sedimentation channel (100*b*) with respect to the larger portion (100*a*), or the relationship between the areas of the two sections (FIG. 7A). In any case, the specific value of these parameters is not essential for the operation of the centering system. In a further embodiment of the present invention, the channel portion with an inclined section (100*c*) is replaced by a discontinuous change of section, or by 90° walls with respect to the vertical axis.

A specific example of the centering system is shown in FIG. 7A in order to describe the operation thereof. In this particular example, the geometry of the widest portion of the sedimentation chamber 100 has a square section having a side of 2 mm (100*a*), while the narrowest portion of the sedimentation chamber 100 has a square section having a side of 1 mm (100*b*). The two portions are connected by means of a narrowing portion (100c), in this case gradual, having a 45° angle with respect to the longitudinal axis of the sedimentation chamber. The measurements related to the square section of the sedimentation chamber given in this example are indicative. The relationship between the sections of the two portions of the sedimentation chamber and the inclination of the narrowing portion are therefore not limited to those deriving from such measurements. The dimensions given in this example are indicative and these particular values are optional.

In a particular use method of the centering device, the fluidic system is regulated in a pulsed manner. In one example the corpuscle 420 is in the position described in FIG. 7B, at time t1 (420t1). Once the pumping system 200 has been activated, the corpuscle is transported following the flow lines imposed by the geometry, until it is positioned as shown in FIG. 7B at time t2 (420t2). The flow is then interrupted, allowing the corpuscle to begin its fall under the balanced action of the gravitational and hydrostatic force. Following this, the corpuscle will be in a more centered position with respect to the sedimentation chamber 100, at time t3 (420t3). The further activation of the pumping system 200 allows the repetition of the process until the centering of the corpuscle 420 is reached.

In a further use method of the centering system, the corpuscle 420 is kept in the narrowing portion 100c by a specially modulated flow inside the sedimentation chamber 100 in order to balance the gravitational action, as indicated in FIG. 7C. Thereby, the lateral component due to the flow lines generated by the variation in channel geometry acts as a lateral thrust, moving the corpuscle from a lateral position at time $t_a$ (420ta) to a more central position at time $t_b$ (420tb).

For both of the solutions shown, the pumping system 200 can be operated manually or automatically.

In an embodiment of the present invention, the detecting device 300 consists of an optical device comprising a microscopy system mounted on a movable support. The resolution of the optical device is adapted to acquire images of all the corpuscles of interest, reaching a level of detail sufficient to process the size and shape thereof. The movable support is guided by the processor 500 to follow the movement of the corpuscle within the sedimentation chamber 100, so that the observed fall length can be long enough to measure enough points to obtain a reliable processing of the terminal velocity of the corpuscle 420. Similarly, in another embodiment, the movable support is adapted to move the sedimentation chamber 100, so that the corpuscle 420 remains within the working range of the detecting device 300.

In another embodiment, the detecting device 300 comprises an optical system capable of supporting various magnifications. For example, this is achieved by a mechanically operated optical axis. The processor 500 selects the correct magnification for the specific corpuscle under examination, and is also capable of selecting the proper balance between resolution, for measuring the geometric properties of the corpuscle, and size of the visual field. The latter must be large enough to allow processing the terminal velocity of the corpuscle.

In another embodiment, it is possible to select the correct magnification for measuring a specific corpuscle without the aid of moving parts. In this embodiment, the sedimentation chamber comprises several flow channels and the detecting device monitors the different flow channels, each with a different magnification. Before the measurement, the detecting device recognizes the corpuscle and the processor manages the introduction thereof into the appropriate flow channel. Furthermore, the architecture of the flow channels can be achieved in different configurations, so as to satisfy the need for corpuscular diversity. In fact, the dimensions, cross-sections, and geometries can be varied, with particular attention to the length of the channel. Thereby, a larger corpuscle is inserted into a longer channel and is monitored at a lower resolution for a larger field of view. Conversely, a smaller corpuscle is inserted into a shorter channel and monitored at a higher resolution for a smaller field of view.

In a variant of this particular embodiment, the mechanism for introducing the corpuscle into the sedimentation chamber 100 is a fluidic multiplexer. In a further variant of this embodiment (FIG. 8), the sedimentation chamber comprises several flow channels (for example 110a, 110b and 110c) connected to independent flow regulators (for example the opening/closing valves 271a, 271b, 271c). All the flow channels are connected in parallel within the fluidic device. In this case, the detecting device 300 recognizes the corpuscle before it reaches the branch, in a specific optically accessible channel 150, and selects the flow channel into which the corpuscle will be introduced by the control on the valves. In another variant of this embodiment, the operator manually selects the flow channel used for the measurement, by operating on a selection valve positioned on the inlet channel 210.

A different strategy to allow measuring the movement of particularly large corpuscles consists in a different localization method thereof, in which the detecting device 300 is able to recognize the passage of the corpuscle 420 through different target positions in the sedimentation chamber 100. The distance between such target positions, as well as the overall distance covered by such a localization system, can be adjusted to precisely determine the terminal velocity of the corpuscle. The terminal velocity of the corpuscle is then determined by dividing the distance traveled by the elapsed time.

In a technical implementation of this device, and of the related method, the detecting device 300 comprises several image recognition systems dedicated to the target positions of the sedimentation chamber 100. The latter, in addition to contributing to measuring terminal velocity, collect information on the corpuscle shape and size. In another technical implementation, the detecting device 300 comprises a series of sensors (e.g., 315a, 315b and 315c in FIG. 9), which are located at the target positions (e.g., 115a, 115b and 115c) of the sedimentation chamber 100, and an independent image recognition system 320 for collecting the shape and size information of the corpuscle 420.

A further strategy to allow measuring the movement of particularly large corpuscles consists in acting on the mass density and viscosity of the analysis medium. For example, in an embodiment of the present invention, the system is adapted to host an analysis medium 450, with a specific mass density for the type of analyzed corpuscles 420, and in particular corresponding to the average mass density of the population of the corpuscles (for example 1035 fg/um3 in the case of SW620 spheroids). Therefore, the total force acting on the corpuscle, i.e., the sum of the gravitational and hydrostatic forces, is directed downwards or upwards depending on the corpuscle mass density. Therefore, during the measuring step in the absence of flow, the denser corpuscles of the analysis medium will tend to move downwards, vice versa for the less dense ones.

In this specific embodiment, the processor 500 and the related processing algorithm are adapted to calculate the descending or ascending terminal velocity. Furthermore, the flow generation system 230 is capable of promoting a flow inside the sedimentation chamber 100 both for and against the gravitational vector. This allows the sample to be moved in the opposite direction with respect to the terminal velocity thereof, thus allowing the measurement to be repeated. Similarly, in another embodiment of the present invention, the system is adapted to house a high viscosity analysis medium 450, which decreases the corpuscle terminal velocity.

In another embodiment of the present invention, the device is adapted to change the analysis medium 450, with one or more analysis mediums 450 having different mass densities. The architecture of the device of this implementation is the same architecture described in FIG. 2, in which the pumping system 200 is adapted to select the new analysis medium to be introduced into the system. In this case, the detecting device 300 measures the corpuscle terminal velocity, and activates the pumping system 300 to modify the analysis medium so that the corpuscle terminal velocity decreases. This protocol can be repeated until the corpuscle terminal velocity is low enough to be easily detectable and measurable.

In the foregoing description of the embodiments of the present invention and of some of the implementations thereof, methods and related tools have been described for performing combined measurements of mass density, weight, size and/or shape of a large set of spherical corpuscles. However, many of the biological samples used in biomedical fields, including the aforementioned samples, may have some deviation from sphericity. In particular, for spheroids and organoids, the sphericity mainly depends on the local variability of the composition and/or of the cellular activity during the formation and maturation of the aggregates themselves. Individual cells can have slight variations from the spherical shape, due, for example, to the internal architecture of the cytoskeleton, to an uneven external pressure of the extracellular matrix or to the presence of rigid cell structures. Therefore, in the following paragraphs, variations of the present invention are disclosed, which take into account the cases in which the three-dimensional shape of the corpuscles deviates from sphericity.

Unlike the case of a spherical corpuscle, for which many detection methods and algorithms are available to calculate the friction coefficient in relation to the radius thereof, the case of a non-spherical corpuscle is more complex, and requires the generalization of the theory previously discussed.

In particular, equations 1 and 2 generalize to the following:

$$v_T = \frac{(\rho_p - \rho_l)V_p g}{k} \quad \text{(eq. 1b)}$$

and $$\rho_p = \frac{v_T k}{V_p g} + \rho_l \quad \text{(eq. 2b)1}$$

In this form, both the friction coefficient k and the volume $V_p$ depend on the corpuscle shape and orientation. There is vast literature on theories which elaborate the geometric features of an object to approximate the friction coefficient k. Such geometric features can be ellipticity, or the ratio between the surface area of a sphere having the same volume as the corpuscle under examination and the real surface of the corpuscle itself. Furthermore, the friction coefficient k can theoretically be calculated through computational fluid dynamics simulations, if the complete 3D shape of the corpuscle is known.

Therefore, the term "radius" used in the context of the embodiments of the present invention, including the preceding paragraphs, is intended as a geometric radius in the case of a spherical corpuscle. However, the term radius is to be understood as an "effective radius", and can also be used to mean a one-dimensional geometric feature which represents an almost spherical or non-spherical corpuscle. For example, the term radius can be understood as the average distance of the surface points from the centroid, or even as twice the ratio of the two-dimensional area to the perimeter, or as the Feret radius (perimeter divided twice pi).

Therefore, as previously written, the terms "shape" and "size" used in the context of the embodiments of the present invention are intended as any geometric description of the corpuscle, which can be used to represent or approximate the two-dimensional or three-dimensional geometry thereof. For example, it can be understood as a measure of the radius, in the case of a spherical corpuscle, or a measure of other geometric features in the case of nearly spherical and non-spherical corpuscles.

Furthermore, accordingly, the term "mass density" or simply "density", used in the context of the embodiments of the present invention, is understood as the ratio of mass to volume in the case of a spherical corpuscle. However, these terms can also be used to mean "effective mass density", which includes, in addition to the previously described definition of density, also variations dependent on shape factors, such as ellipticity and surface roughness in the case of nearly spherical and non-spherical corpuscles.

Likewise, the term "weight" used in the context of the embodiments of the present invention is understood as gravitational mass in the case of a spherical corpuscle. It is instead intended as "effective weight" in the case of non-spherical or nearly spherical corpuscles. Similarly to the description given for the term "mass density", the term "effective weight" comprises variations which depend on shape factors such as ellipticity and surface roughness.

As previously described in different embodiments of the present invention, the performance of different measurements of the same corpuscle allows increasing the reliability of the results. In the case of spherical corpuscles, the statistical distribution obtained is exclusively related to the measurement uncertainty. Conversely, for nearly spherical and non-spherical corpuscles, the experimental distribution of the terminal velocity measurement can be used to describe the size and shape of a corpuscle. In a variant of this embodiment, the standard deviation of the terminal velocity can be used as a parameter for determining the corpuscular ellipticity. This information is relevant, for example, for the generation and selection of uniform spheroids, to be used as a model for drug development. In the different variants of this embodiment, the asymmetry of the distribution of the data obtained from the measurements can be related to geometric symmetry factors, the kurtosis index can be related to the heterogeneity of the shape, and the multi-mode can be related to the distribution of the two-dimensional corpuscle projections.

In a further implementation of the embodiments of the present invention, the images of the corpuscle are processed to obtain the three-dimensional reconstruction thereof, for example, through the use of tomographic algorithms. Such a reconstruction can then be processed by computational tools for the calculation of the friction coefficient. This approach improves the measurement of the absolute value of the mass density for nearly spherical and non-spherical corpuscles.

In particular, different technological implementations can be adopted to obtain the reconstruction of the 3D shape of the corpuscle or to improve the morphological characterization thereof.

Figure 10:
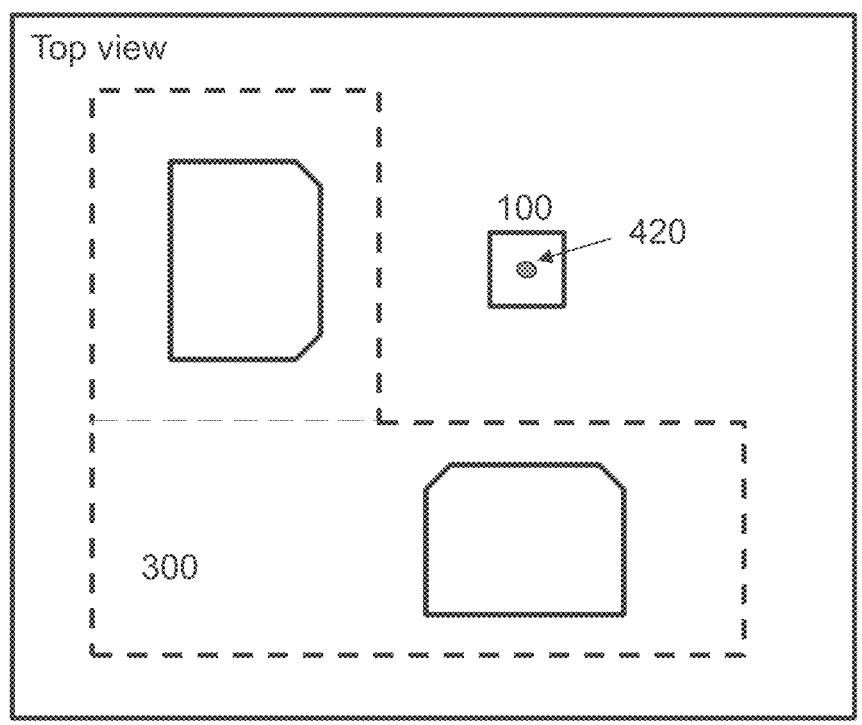
FIG. 10. Diagrammatic depiction of the dual camera system for the bilateral morphological corpuscle characterization.

In a specific implementation of the embodiment of the present invention, the detecting device 300 includes a dual camera system (FIG. 10). The orientation of the cameras, perpendicular to each other with respect to the sedimentation chamber 100, ensures the acquisition of corpuscle images from two different angles. Such images are then processed by the processor 500, to obtain the 3D model.

Figure 11:
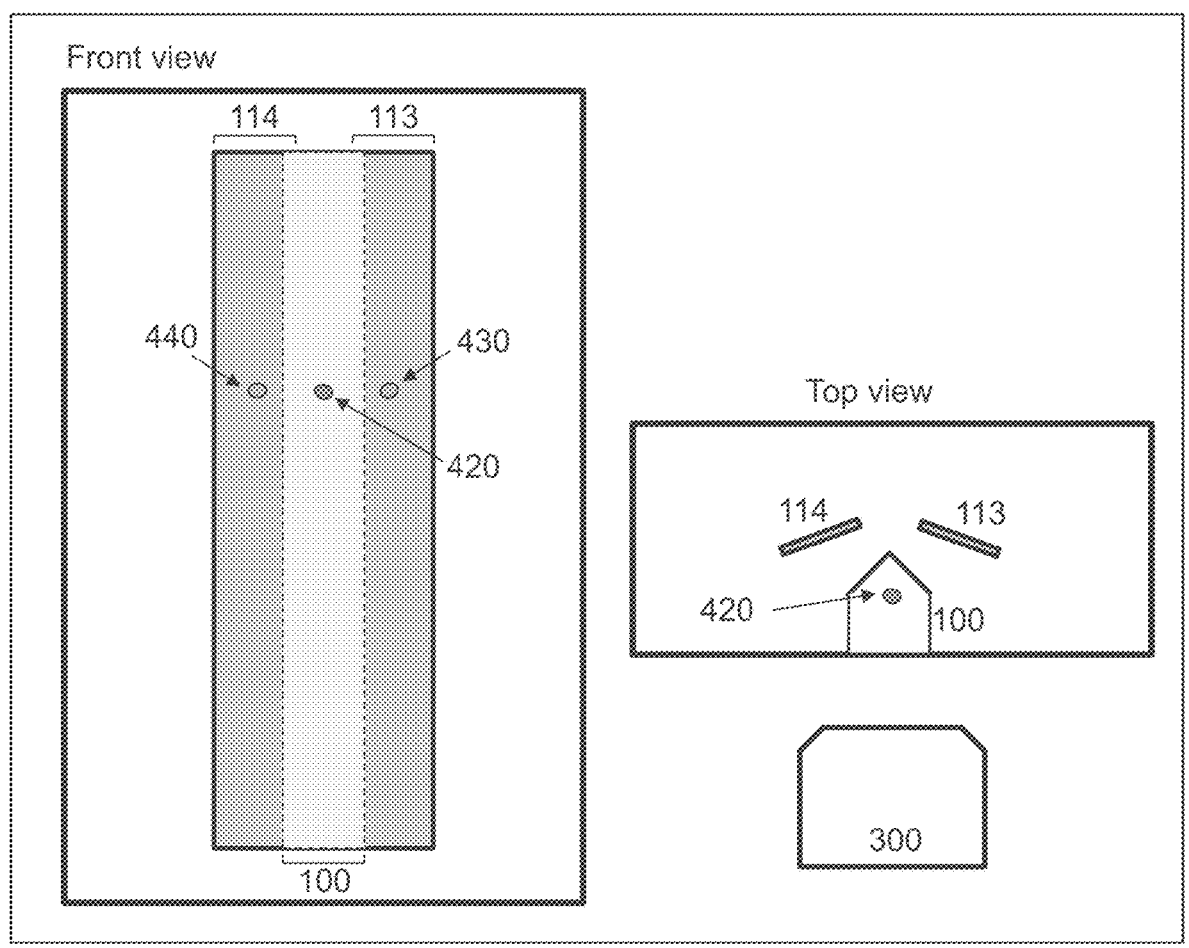
FIG. 11. Diagrammatic depiction of the implementation related to the acquisition of three-dimensional information on the corpuscle based on the acquisition of images reflected from multiple angles.

Conversely, if a single image acquisition system is used, it is possible to adopt different optical, fluidic, or mechanical strategies. For example, in another implementation of the embodiments of the present invention, the fluidic device includes two optical mirrors 113 and 114 therein, near the rear walls of the sedimentation chamber 100, and having a predetermined inclination with respect to the device 300 (FIG. 11). The front camera maintains the focal plane so as to include the reflected images of the corpuscle 430 and 440 obtained from the mirrors 113 and 114, respectively. Through such an implementation, it is possible to simultaneously collect images from different spatial perspectives of the corpuscle and use them for the 3D reconstruction thereof.

In another implementation of the embodiments of the present invention, the device is adapted to acquire image stacks of the corpuscle 420. In such an implementation, the detecting device 300 is composed of at least one camera, in which the focus plane is adjusted to allow scanning the corpuscle by the acquisition of multiple images. Such collected images can be processed by the processor 500 through the application of image filters such as deconvolution, to perform the 3D reconstruction of the corpuscle. Further embodiments of 3D corpuscle reconstruction, such as other image stacking techniques, holographic microscopy, or light-sheet microscopy, can be implemented.

Figure 12:
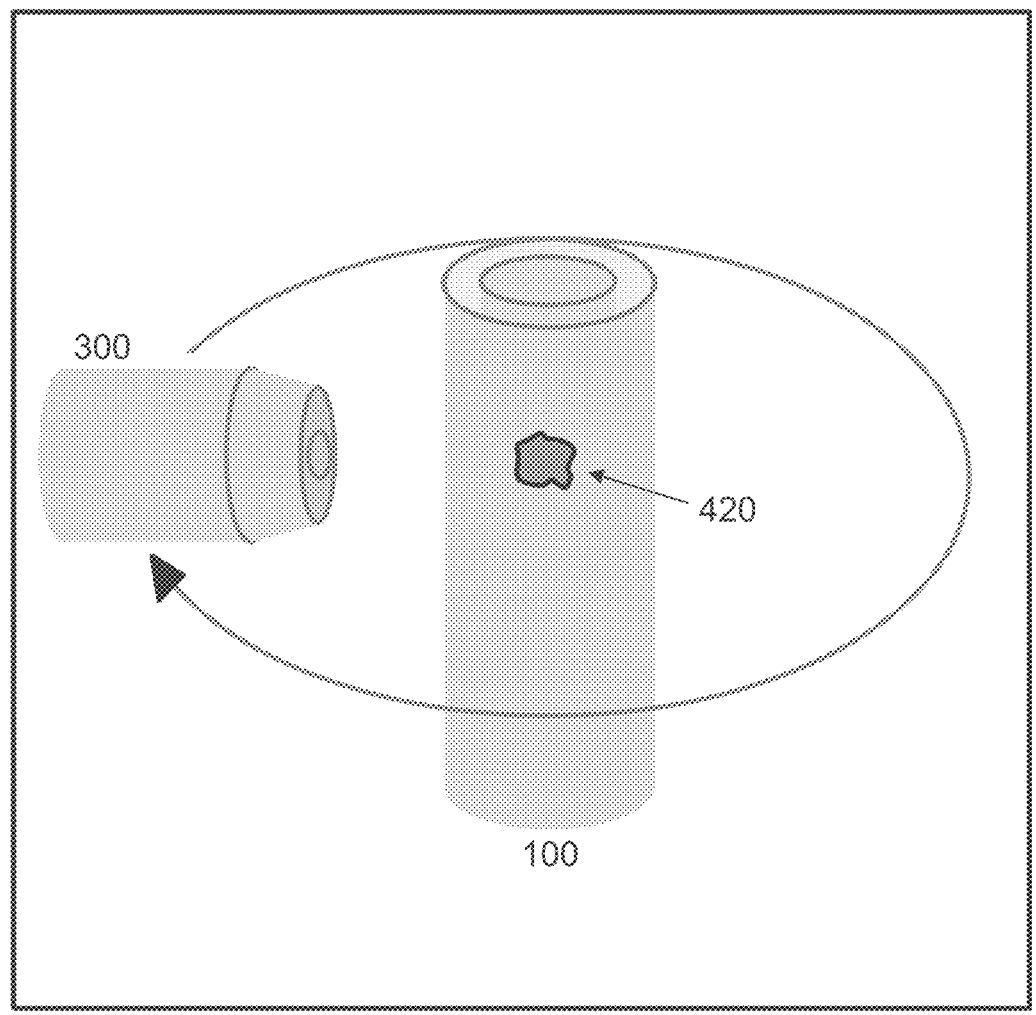
FIG. 12. Diagrammatic depiction of the implementation related to 3D image acquisition based on a detecting device orbiting with respect to a cylindrical sedimentation chamber.

In a further embodiment of the present invention, the detecting device 300 is composed of an image acquisition system which orbits around the sedimentation chamber 100, as shown in FIG. 12. In a specific implementation of this embodiment, the sedimentation chamber 100 is cylindrical. This allows acquiring images from different angles of the corpuscle which are then processed, through a tomographic reconstruction, for the 3D reconstruction of the morphology thereof. In this specific implementation, reference marks are used near the sedimentation chamber 100 to decrease the uncertainty in the measurement of the position of the corpuscle 420 introduced by the rotation of the detecting device 300. The same strategy can be used to minimize the uncertainties introduced in any other implementation which includes moving parts of the detecting system 300. In a variant of this embodiment, the rotating detecting device 300 is adapted to move vertically and follow the movement of the sample in correlation with the terminal velocity thereof. The above implementations and methods adopt known technologies, rearranged to obtain the 3D reconstruction of the corpuscle. Nevertheless, other existing solutions not shown herein can be combined with the embodiments of the present invention.

The preceding paragraphs have described the method, technology, and main use mode of the invention. However, different use modes of the invention will be shown herein in order to demonstrate further advantages thereof.

For example, some alternatives may concern: combined measurements of corpuscle populations, imported for high throughput analyses (increase in the volume of data produced); culturing and prolonged analysis of the corpuscle over time, relevant for applications such as drug testing; and corpuscle sorting, relevant for medical applications or for biological model standardization.

High throughput analyses, obtained from studies performed on a large number of single corpuscles, or on populations, are extremely important in biological fields. For example, information such as the heterogeneity of the population under examination allows understanding the specific behavior of the subpopulations present within the biological sample. In fact, such behavior often tends to have a notable variation from the average of the entire population, and becomes an important discriminatory analysis factor. Nowadays, instruments for measuring the mass density, weight, size, and shape of each corpuscle of the population are not available on the market.

The invention proposes the solution to this shortcoming in the prior art, also allowing the extrapolation of the data required for the statistical analysis of the corpuscular population in general through an implementation of the fluidic device where the corpuscle data which the processor 500 receives from the detecting system 300 are related to a multitude of corpuscles, and comprise at least one of velocity, shape, position, and size of more than one corpuscle. A specific embodiment exploits the same scheme described in FIG. 2, where the detecting system 300 consists of a microscopy system, connected to the processor 500. This implementation allows for the concomitant measurement of the mass density, weight, size, and shape of each corpuscle of the population. Similarly to the main use method described above, the corpuscles 420 contained in the analysis medium 450 are collected by the tank 400 and introduced through the inlet channel 210 of the pumping system 200. The flow generation system 230 is activated to guide the corpuscles into the sedimentation chamber 100, the flow is then stopped and the analysis is performed during the fall of the corpuscles by gravity. In this specific use mode, the detecting device 300 is adapted to simultaneously monitor each corpuscle 420 present inside the sedimentation chamber 100 during the measurement. The terminal velocity and the size of each individual component of the population are calculated by indexing each corpuscle 420 monitored inside the sedimentation chamber 100. Thereby, the distributions of mass density, weight, size, and shape of the population are extrapolated after several repetitions of the measurement, while the information on each corpuscle is still maintained.

In another implementation, a larger volume of data is obtained through particular geometries of the sedimentation chamber 100. Although in the devices illustrated in the figures the sedimentation chamber 200 or the flow channels 110 comprised therein are straight and have no curves, the sedimentation chamber 200 can alternatively also have a curvilinear geometry. In this embodiment, the sedimentation chamber can for example comprise a single channel having a serpentine architecture, so that several vertical portions thereof, where the analysis occurs, can be monitored by the detecting device 300. The high throughput, applied to the embodiments of the present invention, allows extrapolating important data such as the statistical distribution of the analyzed corpuscular population. For example, a normal (or Gaussian) distribution provides information on the homogeneity of the population. The analysis of the standard deviation of such a distribution can therefore be relevant to define the quality of a sample. This is important for example in the case of cellular databases, which can certify the quality of the available samples. Conversely, a bimodal or multimodal distribution can identify the presence of different subpopulations or categories. For example, it can provide information on the various cell lines present in a heterogeneous population, or it can distinguish cells which are at different stages of the cell life cycle, in the case of homogeneous populations. Furthermore, still considering the case of a homogeneous population subjected to pharmacological treatment, a difference in the statistical distribution from normal to bi- or multi-modal can discriminate, for example, the permeation of the drug and/or the efficacy thereof.

Another aspect of the invention aims at avoiding wasting the analysis medium, by a device capable of keeping the corpuscle suspended inside the sedimentation chamber, through a closed-loop fluidic system. This is particularly important for applications which use expensive analysis mediums, such as during the long pre-market characterization phases of drugs.

A further implementation of the present innovation is related to the culture and simultaneous analysis of single cells or cell aggregates over time. Such an aspect is of great interest in the biomedical and clinical fields. For example, monitoring changes in physical properties of samples during drug treatment is useful in the pharmacological field for applications such as personalized medicine, oncology, and medically-assisted procreation.

This implementation consists of a device and the respective method for measuring the mass density, weight, size and/or shape of a corpuscle for a desired period of time, up to several weeks. Furthermore, the method is non-destructive, and the specific corpuscle selected for the analysis can be appropriately recovered after the analysis for further investigations.

Figure 3:
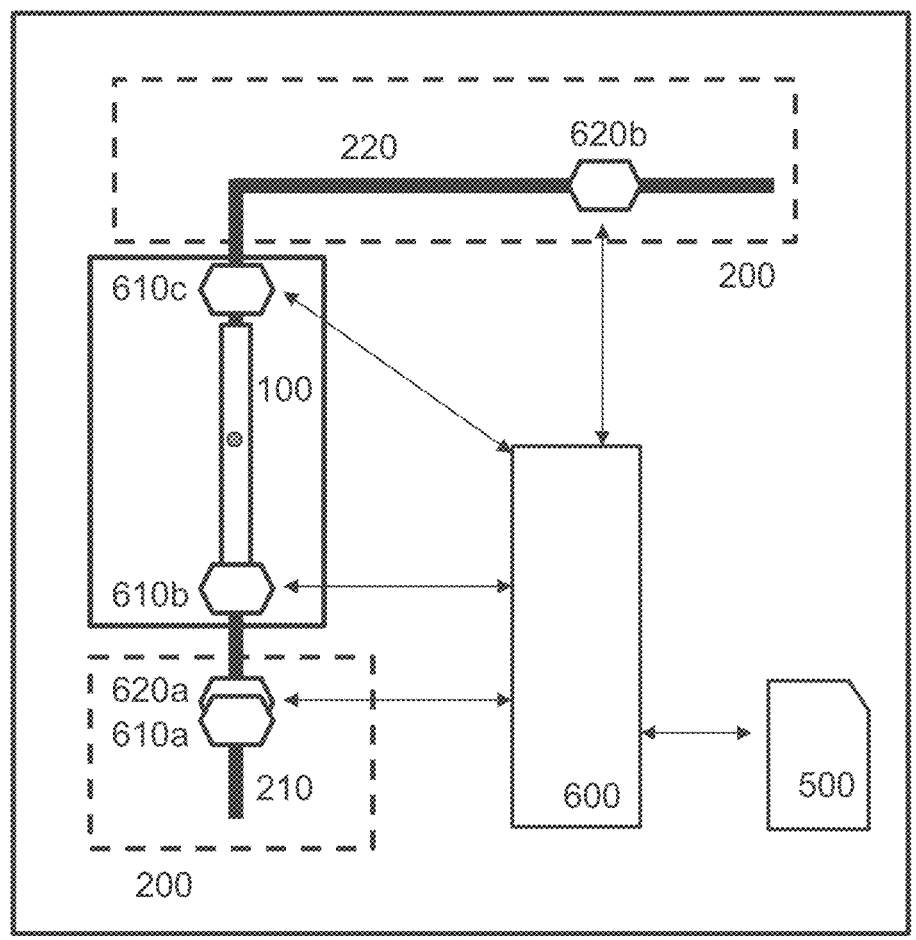
FIG. 3. Diagrammatic depiction of the implementation related to the temperature control device.

Although in the fluidic devices illustrated in FIGS. 2 and 3, the pumping systems 200 are linear, the pumping system 200 may also comprise one or more liquid recirculation systems, and one or more flow generation systems for the liquid circulation inside the pumping system 200 and the sedimentation chamber. In a specific implementation, shown in FIG. 13, the pumping system 200 comprises a further recirculation channel 250 and a secondary pumping system, called recirculation device 240 (FIG. 13) herein. The protocol for introducing the corpuscle into the fluidic device is similar to that previously described. A corpuscle 420, contained in the analysis medium 450, is extracted from the tank 400 and introduced into the pumping system 200 through the inlet channel 210. The flow generation system 230 is activated to introduce the corpuscle into the sedimentation chamber 100, which is monitored by the detecting device 300. The pumping system 200 further comprises a recirculation channel 250 circularly connected with the sedimentation chamber and a recirculation device 240 (FIG. 13), which is activated by the processor 500 to keep the corpuscle inside the sedimentation chamber 100, through the generation of a circular flow controlled based on the corpuscle data obtained from the detecting system 300. The recirculation channel 250 allows the analysis medium to be recycled, with the advantage of minimizing the expenditure thereof.

Figure 13:
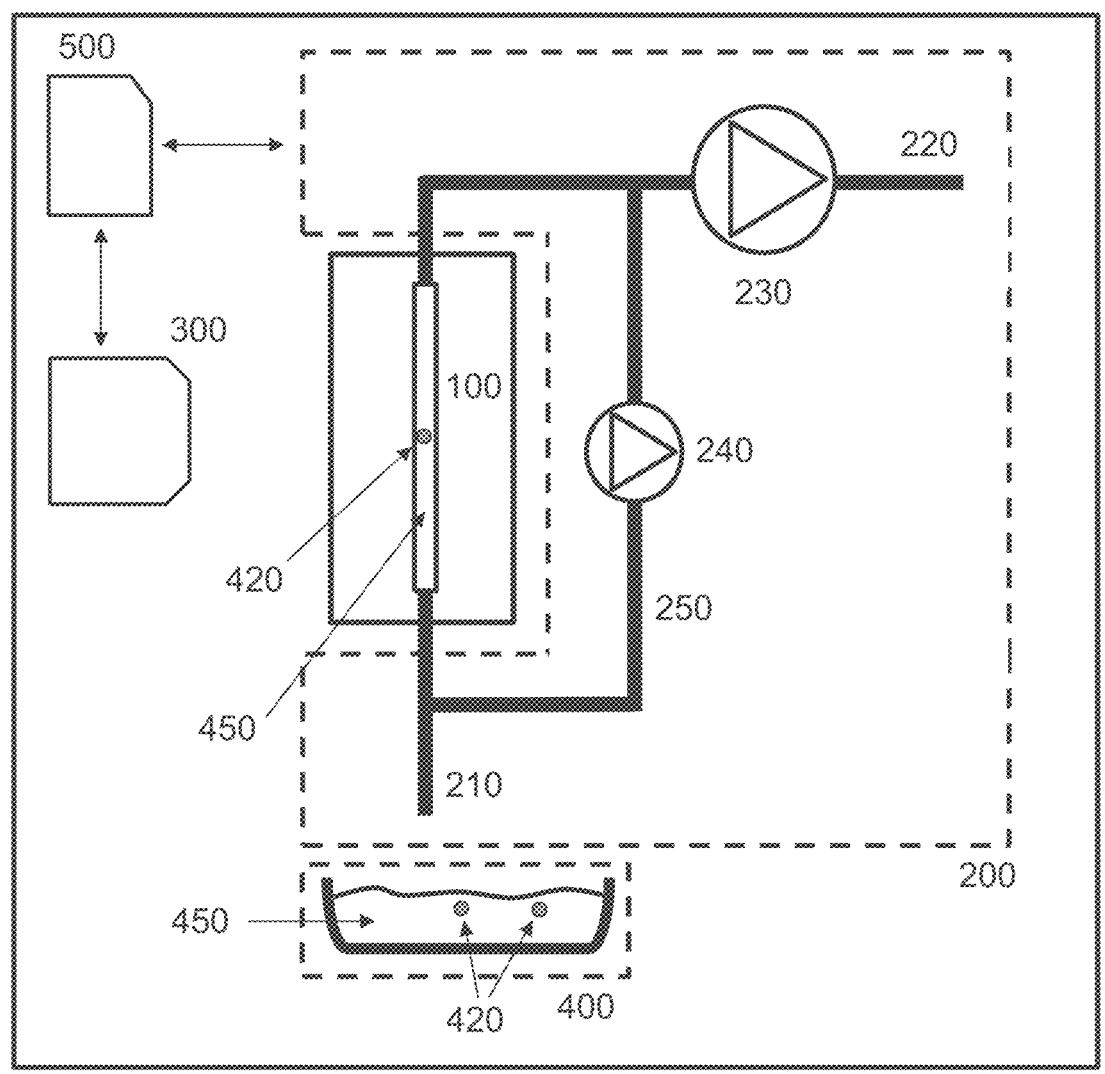
FIG. 13. Diagrammatic depiction of the implementation containing a recirculation channel, and related secondary pumping system.
Figure 14:
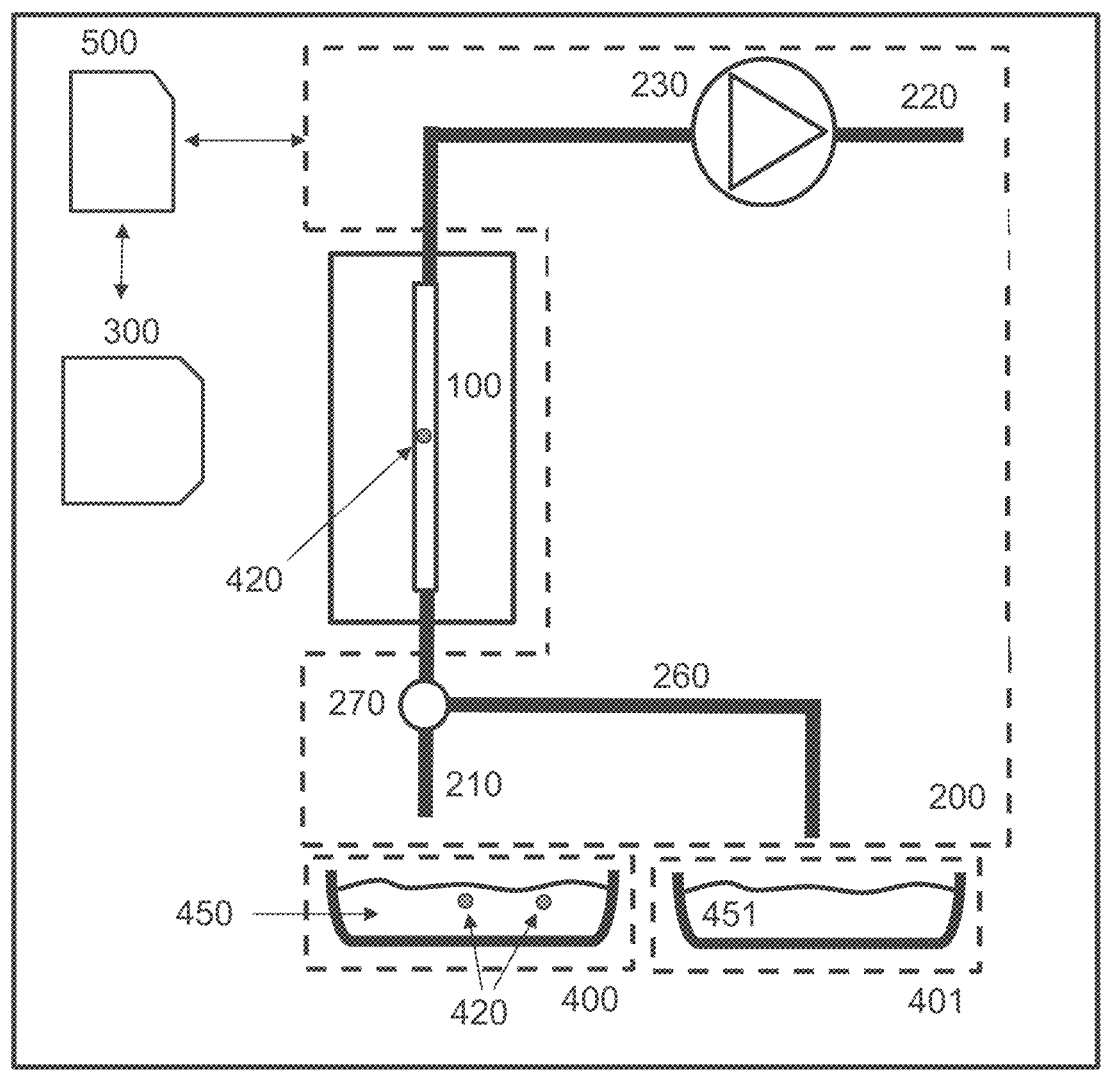
FIG. 14. Diagrammatic depiction of the implementation containing a secondary channel for the introduction and exchange of further analysis mediums.
Figure 15:
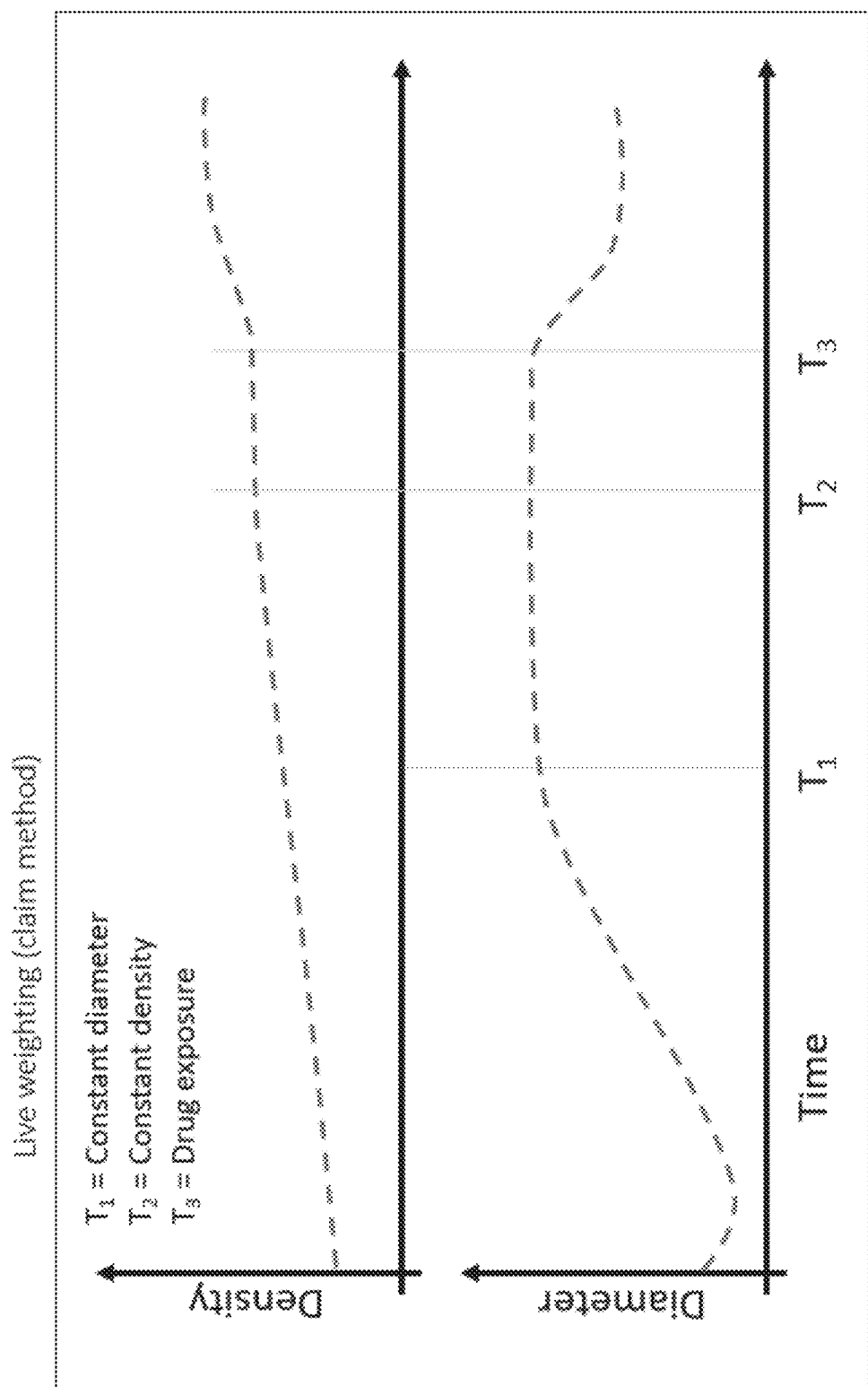
FIG. 15. Graphical depiction of the monitoring of spheroid diameter and density with respect to time, for the evaluation of the maturation degree thereof before treatment with the drug.

An implementation of the embodiments of the present invention allows measuring the corpuscle mass density, weight, size, and shape before and after replacing the main analysis medium 450 with one or more different analysis mediums 451. In this implementation, the pumping system 200 further comprises one or more secondary channels fluidly connected to the sedimentation chamber 100 for the introduction or removal of liquids and/or corpuscles into/from one or more additional tanks. The secondary channels can be connected directly to the sedimentation chamber 100, or they can be connected through an inlet channel or through a secondary fluidic circuit. A specific implementation of this embodiment adopts a variation of the fluidic device described in FIG. 2. The corpuscle 420 is introduced into and kept suspended inside the first analysis medium 450, in the sedimentation chamber 100, through the pumping system 200. In this implementation, the pumping system 200 comprises a secondary channel for buffer exchange 260 (FIG. 14), connected to a second tank 401 which contains the new analysis medium 451. The system allows the introduction of the new analysis medium 451 into the sedimentation chamber 100 through the secondary channel for buffer exchange 260. The corpuscle is kept inside the sedimentation chamber 100 during the replacement of the main analysis medium 450. Repeated a few times, this procedure leads to the complete exchange between the analysis mediums both in the sedimentation chamber 100 and in the recirculation channel 250. In a specific variant of this embodiment, the junction between the secondary channel for buffer exchange 260 and the inlet channel 210 is a selection valve 270. In another variant of this embodiment, the system is adapted to draw from a tank 401 which contains the new analysis medium 451 by the same inlet channel 210 through which the corpuscle is introduced, either by manual or automated tank replacement 400. In a further variation of this implementation, the pumping system 200 comprises the secondary channel for buffer exchange 260 (FIG. 14), the recirculation channel 250, and the recirculation system 240 (FIG. 13). This implementation allows performing measurements of corpuscle mass density, weight, size and/or shape during periods of time even of several days or weeks, during which it is possible to perform changes of the liquid in which the corpuscle is kept and analyzed. The combination of these use modes can in fact be advantageous for different applications. For example, the corpuscle can be treated for a long period of time while frequent changes of the analysis medium are performed. In doing so, during each replacement it is possible to introduce a second liquid which has different features from the previous one, for example small variations in the concentration of a drug for the analysis of the toxicity thereof. Conversely, the treatment can be more intense, introducing a second analysis medium which has significantly different features from the first, and then monitoring the reaction of the corpuscle to such a variation. In an embodiment of the present invention, the same corpuscle is analyzed when subjected to a sequence of analysis mediums with different ionic strength. By this embodiment, it is possible to measure the effect of the ionic strength on the corpuscle 420. In some use methods, the use of the correct analysis medium is a critical aspect for the technical implementation of this embodiment: if the corpuscle has a semipermeable membrane (e.g., if it is a single cell or a spheroid), an iso-osmotic analysis medium (for example PBS 0.9% w/v for cells) allows measuring the natural corpuscle mass density. In a different embodiment of the present invention, the test medium is not iso-osmotic with the corpuscle and the influence of the ionic strength on the corpuscle can be measured.

In a different embodiment of the present invention, the sequence of analysis mediums used to treat the corpuscle 420 may contain a drug, or other biologically active compound, which may affect the size, volume, mass density and/or weight thereof. In this case, the system measures the effect of the compound on the cell, spheroid or organoid. A potential result of monitoring the bulk density and live sample size is shown in a graphical depiction shown in FIG. 15. Here, the corpuscle is considered to have spherical geometry, and the size thereof is plotted as a diameter. The example shown aims at recognizing the maturation stage of the spheroid, and the time required for the interaction thereof with the drug. In this illustrative graph, the corpuscle grows both in diameter and in mass density, until the time T1 is reached. Thereafter, the stabilization of the diameter is observed, although the density continues to increase. This indicates a compaction phase up to time T2, when the density also reaches the plateau, in which the spheroid is in an ideal maturity condition for changing the analysis medium. Time T3 represents the moment related to the introduction of a drug, and the subsequent trend shows the effect thereof. This procedure offers the possibility to observe and compare the change in density and diameter over time and to gather valuable details on the interaction of the corpuscle with the drug.

A variant of this embodiment relates to the combination of culture and long-term corpuscle analysis, with a solution for changing the analysis medium. In fact, a further important aspect of scientific research concerns the possibility of monitoring a sample during changes in the surrounding environment thereof, such as pH, ionic strength, change in growth factors in the culture medium, or during specific treatments with pharmacological agents and/or chemicals.

A further use mode of the embodiment of the present invention allows the sorting of corpuscles, i.e., the organization and sorting of subpopulations of corpuscles. This operation is important in the biomedical field, as it allows the collection of subpopulations of corpuscles based on specific properties or geometric features. Cell sorting is commonly used in medicine, pharmacology, and scientific research in general. The applications thereof include, for example, the fields of regenerative medicine and personalized medicine, as well as those of anticancer therapy or virology. Current cell sorting methods base the selection of samples on factors such as the presence of protein markers, or specific biochemical interactions. However, there is currently no technology capable of selecting and sorting a wide range of samples based on mass density, weight, size, and shape. Therefore, another implementation of the present invention relates to a method, and related device, for the selective sorting of corpuscles based on the concomitant measurement of these properties.

Figure 16:
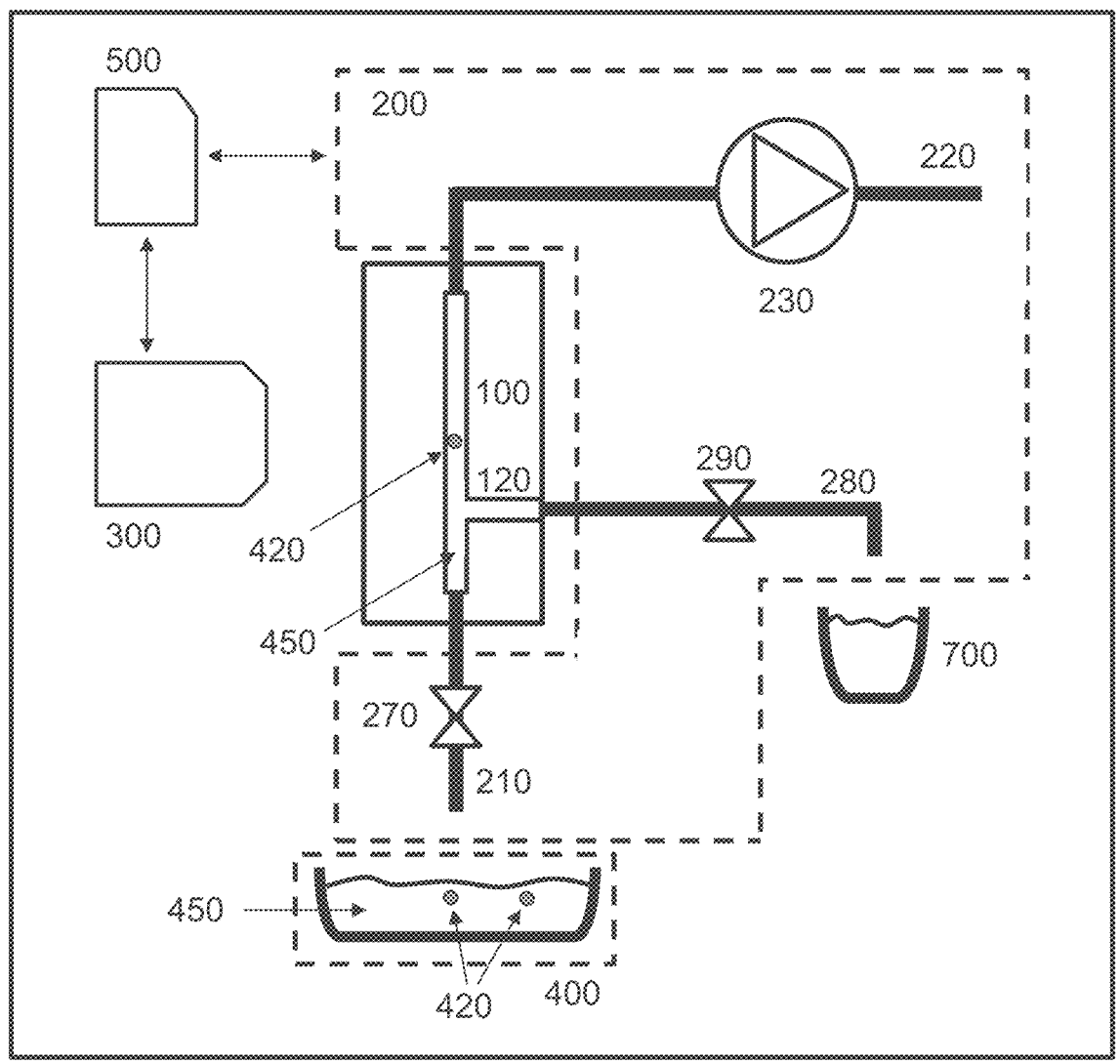
FIG. 16. Diagrammatic depiction of the implementation dedicated to corpuscle sorting.

In a specific embodiment of this implementation, the sedimentation chamber 100 includes a bifurcation which connects it to a recovery channel 120 in turn fluidly connected to a specific portion of the pumping system 200, called secondary channel for sorting 280 (FIG. 16) herein. Both the inlet channel 210 and the secondary channel for sorting 280 are controlled by a flow regulator, such as the valves 270 and 290. In this implementation, a corpuscle 420 is introduced into the sedimentation chamber 100 through the inlet channel 210 while the valve 290 is closed and the valve 270 is kept open. Once the measurement of the corpuscle is finished as described in the previous implementations, the results are evaluated for sorting the sample based on the mass density, weight, size, and shape values. The selected corpuscle is then collected by activating the pumping system 200, while the valve 270 is closed and the valve 290 is kept open to allow the passage of the corpuscle through the recovery channel 120 and the secondary channel for sorting 280, to finally reach the tank 700 (FIG. 16).

In a variant of the present embodiment, the corpuscle is selected and sorted exclusively based on the mass density thereof. This is relevant for decreasing the inhomogeneity of scientific tests, allowing for example the selection and collection of a subpopulation of spheroids having a similar degree of compaction. In another variant of the present embodiment, it is possible to combine several measured parameters for the selection of the collected corpuscles. For example, features such as the standard deviation of the measured diameter and the terminal velocity can be used to sort corpuscles according to the degree of sphericity thereof. This specific application could be relevant for testing the spread of drugs on different homogeneous batches of spheroids, and could provide information on the time it takes for the drug to reach the nucleus. This same application could also provide information on the concentration level of the drug required to efficiently cross a number of cell layers, as well as to perform studies on the toxicity thereof.

In further variations of the present embodiment, the parameters and limit values to be used for sorting could for example be defined by the user, or be extracted from databases; or they could be automatically defined by an unsupervised algorithm which can sort similar families of corpuscles within populations.

A further aspect of the innovation relates to the importance of the translation from the manual to the automated process, in particular when moving from laboratory use to large-scale medical and industrial applications. The invention shown is conceived so as to be easily automated through the use of existing devices, by virtue of the low number of hardware components. Such components can also be easily miniaturized with existing technologies.

The invention claimed is:

1. A fluidic device for measuring at least one of a corpuscle mass density and weight, where said fluidic device comprises:
   a sedimentation chamber fluidly connected to an inlet channel
   a pumping system connected to the sedimentation chamber, wherein said pumping system is adapted to control liquid flow in the sedimentation chamber, wherein the sedimentation chamber comprises a flow channel having a variable internal cross-section, such as to allow the pumping system to induce flows in the sedimentation chamber having a non-zero horizontal component; and
   a processor configured to:
      obtain corpuscle data related to a corpuscle in at least one region of the sedimentation chamber; and
      calculate at least one of corpuscle mass density and weight based on the data received.

2. A fluidic device according to claim 1, further comprising at least one detecting device configured to acquire the corpuscle data and to provide the corpuscle data to the processor.

3. A fluidic device according to claim 1, where the processor is configured to control the pumping system based on at least a part of the obtained corpuscle data.

4. A fluidic device according to claim 1, wherein the corpuscle data comprise at least one of corpuscle velocity, shape, position, size.

5. A fluidic device according to claim 1, further comprising a temperature control device, configured to provide the processor with a temperature measurement of a liquid in the sedimentation chamber, wherein the processor is configured to calculate at least one of the corpuscle mass density and weight based on said temperature measurement.

6. A fluidic device according to claim 5, wherein the temperature control device is further configured to adjust the temperature of the liquid in the sedimentation chamber based on at least one of the corpuscle mass density and weight provided by the processor and a predetermined temperature value.

7. A fluidic device according to claim 1, further comprising a movable support adapted to house at least a part of the at least one detecting device,
wherein the processor is further configured to guide the movable support based on at least a part of the corpuscle data received.

8. A fluidic device according to claim 1, wherein the sedimentation chamber comprises flow channels connected in parallel to one another and to the inlet channel, wherein each flow channel is also connected to a flow regulator,
wherein the processor is configured to:
receive input data related to a corpuscle in the inlet channel; and
control the flow regulators based on said input data.

9. A fluidic device according to claim 1, wherein the pumping system comprises a recirculation channel connected in parallel to the sedimentation chamber, wherein said recirculation channel comprises a recirculation device, and
wherein the processor is configured to control said recirculation device for recirculation of liquid in the sedimentation chamber.

10. A fluidic device according to claim 1, wherein the pumping system further comprises a secondary channel fluidly connected to the sedimentation chamber,
wherein the processor is configured to selectively control the flow in the secondary channel to introduce liquid into the sedimentation chamber and/or to expel liquid from the sedimentation chamber through the secondary channel.

11. A method for measuring at least one of corpuscle mass density and weight, said method comprising:
introducing a corpuscle to be analyzed into a sedimentation chamber of a fluidic device through an inlet channel;
using a flow channel of the sedimentation chamber, the flow channel having a variable internal cross-section, to allow a pumping system to induce flows in the sedimentation chamber having a non-zero horizontal component;
obtaining corpuscle data, wherein said corpuscle data are related to a corpuscle in at least one region of the sedimentation chamber, wherein said corpuscle is moving in a liquid at rest in the sedimentation chamber; and
calculating at least one of corpuscle mass density and weight based on the data received.

12. A method according to claim 11, further comprising:
selecting a corpuscle based on one of mass density, weight, size, and shape; and
collecting the selected corpuscle in a predetermined container based on at least one of corpuscle mass density, weight, size, and shape.

* * * * *